(12) United States Patent
Hazama et al.

(10) Patent No.: US 10,850,762 B2
(45) Date of Patent: Dec. 1, 2020

(54) STEERING DEVICE SUPPORT STRUCTURE FOR VEHICLE

(71) Applicant: MAZDA MOTOR CORPORATION, Hiroshima (JP)

(72) Inventors: Masaya Hazama, Izumisano (JP); Toshiki Okauji, Hikone (JP); Norio Kasajima, Suita (JP); Takeshi Kitagawa, Higashiomi (JP); Yoshiyasu Kajimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 132 days.

(21) Appl. No.: 16/031,143

(22) Filed: Jul. 10, 2018

(65) Prior Publication Data

US 2019/0016366 A1    Jan. 17, 2019

(30) Foreign Application Priority Data

Jul. 12, 2017    (JP) .................................. 2017-136553

(51) Int. Cl.
| | |
|---|---|
| *B62D 1/19* | (2006.01) |
| *B62D 21/15* | (2006.01) |
| *B62D 25/14* | (2006.01) |
| *B62D 29/00* | (2006.01) |
| *B62D 29/04* | (2006.01) |

(52) U.S. Cl.
CPC ............ *B62D 1/195* (2013.01); *B62D 21/15* (2013.01); *B62D 25/145* (2013.01); *B62D 29/00* (2013.01); *B62D 29/008* (2013.01); *B62D 29/043* (2013.01)

(58) Field of Classification Search
CPC ...... B62D 1/195; B62D 21/15; B62D 25/145; B62D 29/00
See application file for complete search history.

(56) References Cited

U.S. PATENT DOCUMENTS

| | | | | |
|---|---|---|---|---|
| 5,564,769 | A  * | 10/1996 | Deneau .................. | B62D 21/15 180/90 |
| 8,919,855 | B2 * | 12/2014 | Ruiz Rincon ........ | B62D 25/145 296/70 |
| 9,227,671 | B2 * | 1/2016 | Aoki ...................... | B62D 21/15 |
| 9,233,415 | B2 * | 1/2016 | Nakano .................... | B22C 9/22 |
| 9,381,883 | B2 * | 7/2016 | Morita .................. | B60R 21/203 |
| 9,493,192 | B2 * | 11/2016 | Baudard ............. | B62D 25/145 |

(Continued)

FOREIGN PATENT DOCUMENTS

| | | |
|---|---|---|
| EP | 2 452 861 A1 | 5/2012 |
| JP | 2004-189040 A | 7/2004 |
| JP | 2012-106517 A | 6/2012 |

*Primary Examiner* — Faye M Fleming
(74) *Attorney, Agent, or Firm* — Studebaker & Brackett PC

(57) ABSTRACT

Provided is a steering device support structure having better collision performance and more excellent steering device vibration performance. The steering device support structure 10 for a vehicle comprises: a cross car beam 1 having a given axial direction and comprising a planar portion extending along the axial direction; a steering device support member attached to the cross car beam 1 to support a steering device; and a center stay 3 for supporting the cross car beam 1. The steering device support structure further comprises a reinforcing member 5 (5a, 5b) provided to the cross car beam to cover the planar portion 1b of the cross car beam, and fastened to the steering device support member 2.

18 Claims, 22 Drawing Sheets

(56) References Cited

U.S. PATENT DOCUMENTS

| | | | | |
|---|---|---|---|---|
| 10,464,516 B2* | 11/2019 | Gewert | ................ | B60R 21/045 |
| 2019/0031247 A1* | 1/2019 | Baudart | ............... | B62D 25/142 |
| 2019/0168818 A1* | 6/2019 | van Aken | ............ | B62D 25/145 |
| 2019/0176889 A1* | 6/2019 | Mullen | ................. | B62D 21/03 |

\* cited by examiner

STEERING DEVICE SUPPORT STRUCTURE FOR VEHICLE

FIELD OF THE INVENTION

The present invention relates to a steering device support structure for a vehicle.

BACKGROUND ART

As a steering device support structure for supporting a steering device of a vehicle such as an automobile, there has been known a structure comprising a cross car beam (CCB) extending in a vehicle width direction of the vehicle, a steering device support member for supporting a steering device while being supported by the cross car beam, and a center stay for supporting the cross car beam in a central region thereof.

In regard to such a steering device support structure, various techniques intended to achieve a reduction in weight and an improvement in rigidity. For example, JP 2012-106517A (hereinafter referred to as "Patent Document 1") discloses a technique relating to a cross car beam comprising a front passenger-side first pipe member and a driver seat-side second pipe member formed to have an outer diameter greater than that of the first pipe member, wherein a metal plate member is attached as a stiffening or reinforcing member to an outer peripheral surface of a front part of the driver seat-side second pipe member.

Further, a coupling structure is disclosed which is designed for a steering member comprising a driver seat-side member having a driver seat-side tubular portion and a front passenger seat-side member having a front passenger seat-side tubular portion with an outer dimension less than an inner dimension of the driver seat-side tubular portion (see, for example, JP2004-189040A (hereinafter referred to as "Patent Document 2"). In regard to such a coupling structure, this Patent Document 2 discloses a technique in which a reinforcing member is attached to extend from an outer peripheral surface of a lower part of the front passenger seat-side tubular portion to a coupled section between the two tubular portions, to reinforce an air intake opening area of the front passenger seat-side tubular portion, and the coupled section.

The inventors of the present invention have found that the above conventional techniques have difficulty in satisfying both of good collision performance and good steering device vibration performance. Specifically, forming a cross car beam to have a rectangular cross-section is effective in keeping up collision performance. However, the technique disclosed in the Patent Document 1 is insufficient in collision performance because the cross car beam used therein has a circular cross-sectional shape. On the other hand, the technique disclosed in the Patent Document 2 makes it possible to obtain good collision performance because the cross car beam used therein has a rectangular cross-sectional shape. However, due to a force input to the steering device support structure, torsional deformation is likely to occur in the steering device support member and therearound about an axial direction of the cross car beam. In this situation, if a vibration such as a traveling vibration during traveling and an engine vibration during engine running is input to the steering device support structure, a vibration arising from torsional deformation is likely to be transmitted to a steering device, resulting in giving a driver a discomfort feeling. The transmitted vibration causes not only "shaking" of the steering device itself but also propagates as a sound wave, resulting in giving a fellow passenger a discomfort feeling.

The present invention has been made with a view to solving the above conventional problems, and an object thereof is to provide a steering device support structure having better collision performance and more excellent steering device vibration performance.

It is another object of the present invention to provide a steering device support structure having better collision performance and more excellent steering device vibration performance, and having the capability of achieving a further reduction in weight.

SUMMARY OF THE INVENTION

In order to achieve the above object, the present invention provides a steering device support structure for a vehicle, which comprises: a cross car beam having a given axial direction and comprising a planar portion extending along the axial direction; a steering device support member attached to the cross car beam to support a steering device; and a center stay for supporting the cross car beam. The steering device support structure is characterized in that it further comprises a reinforcing member provided to the cross car beam to cover the planar portion of the cross car beam, and fastened to the steering device support member.

The steering device support structure of the present invention having the above feature makes it possible to obtain better collision performance and better steering device vibration performance.

Further, the steering device support structure of the present invention having the above feature makes it possible to achieve a further reduction in weight.

Preferably, in the steering device support structure of the present invention, the reinforcing member is a member capable of converting, into a flexural deformation mode, a torsional deformation mode of the cross car beam caused by a force input to the steering device support structure.

Preferably, in the steering device support structure of the present invention, the cross car beam has a rectangular shape in cross-sectional view, wherein the rectangular shape has a top surface, a bottom surface, a front surface and a rear surface, and wherein the planar portion of the cross car beam is formed in the rear surface of the cross car beam, and the reinforcing member is provided to cover the rear surface.

Preferably, in the steering device support structure of the present invention, the reinforcing member has a rib structure which comprises: a planar-shaped member; an outer edge rib provided to extend from an outer edge of the planar-shaped member in a direction perpendicular to the planar-shaped member; and an inner rib provided on an inner side of the outer edge rib to extend from the planar-shaped member in the direction perpendicular to the planar-shaped member, and wherein the reinforcing member is provided to the cross car beam such that the planar-shaped member thereof comes into surface contact with the planar portion of the cross car beam.

Preferably, in the steering device support structure of the present invention, the inner rib of the reinforcing member includes a perpendicular rib extending on the planar-shaped member in a direction perpendicular to the axial direction of the cross car beam.

Preferably, in the steering device support structure of the present invention, the steering device support member and the center stay are provided on the cross car beam in spaced-apart relation to each other, and the reinforcing member is provided to cover a part of the planner portion of the cross car beam located between the steering device support member and the center stay.

Preferably, the steering device support structure of the present invention further comprises first and second side brackets for fixing opposite ends of the cross car beam to a body of the vehicle so as to support the cross car beam at the opposite ends thereof, wherein the reinforcement member is fastened to the steering device support member, and at least one of the first side bracket and the center stay.

Preferably, the steering device support structure of the present invention further comprises first and second side brackets for fixing opposite ends of the cross car beam to a body of the vehicle so as to support the cross car beam at the opposite ends thereof, wherein the steering device support member and each of the first and second side brackets are provided on the cross car beam in spaced-apart relation to each other, and the reinforcing member includes a side bracket-side reinforcing member provided to cover a part of the planner portion of the cross car beam located between the first side bracket and the steering device support member.

More preferably, in the above steering device support structure, the side bracket-side reinforcing member is fastened to at least the steering device support member, wherein the fastening between the side bracket-side reinforcing member and the steering device support member is achieved by two-component co-fastening for the side bracket-side reinforcing member and the steering device support member.

More preferably, in the above steering device support structure, the side bracket-side reinforcing member has a fastening end portion on the side of the steering device support member, and the steering device support member comprises an upper segment and a lower segment, wherein the two-component co-fastening for the side bracket-side reinforcing member and the steering device support member is achieved by fastening between the fastening end portion of the side bracket-side reinforcing member and each of the upper and lower segments of the steering device support member.

More preferably, in the above steering device support structure, the side bracket-side reinforcing member is further fastened to the first side bracket, wherein the fastening between the side bracket-side reinforcing member and the first side bracket is achieved by three-component co-fastening for the side bracket-side reinforcing member, the first side bracket, and the cross car beam.

More preferably, in the above steering device support structure, the side bracket-side reinforcing member is further fastened to the cross car beam, wherein the fastening between the side bracket-side reinforcing member and the cross car beam is achieved by three-component co-fastening for the side bracket-side reinforcing member, the first side bracket, and the cross car beam, and/or two-component co-fastening for the side bracket-side reinforcing member and the cross car beam.

More preferably, in the above steering device support structure, the cross car beam has a rectangular shape in cross-sectional view, wherein the rectangular shape has a top surface, a bottom surface, a front surface and a rear surface, and wherein the planar portion of the cross car beam is formed in the rear surface of the cross car beam, and the side bracket-side reinforcing member has an extension portion extending from the top surface to the bottom surface of the cross car beam so as to form an angular C-shaped surrounding portion which covers the planner portion formed in the rear surface of the cross car beam, a part of the top surface of the cross car beam, and a part of the bottom surface of the cross car beam.

Preferably, in the steering device support structure of the present invention, the center stay and the steering device support member are provided on the cross car beam in spaced-apart relation to each other, and the reinforcing member includes a center stay-side reinforcing member provided to cover a part of the planar portion of the cross car beam located between the center stay and the steering device support member.

More preferably, in the above steering device support structure, the center stay-side reinforcing member is fastened to at least the steering device support member, wherein the fastening between the center stay-side reinforcing member and the steering device support member is achieved by two-component co-fastening for the center stay-side reinforcing member and the steering device support member.

More preferably, in the above steering device support structure, the center stay-side reinforcing member has a fastening end portion on the side of the steering device support member, and the steering device support member comprises an upper segment and a lower segment, wherein the two-component co-fastening for the center stay-side reinforcing member and the steering device support member is achieved by fastening between the fastening end portion of the center stay-side reinforcing member and each of the upper and lower segments of the steering device support member.

More preferably, in the above steering device support structure, the center stay-side reinforcing member is further fastened to the center stay, wherein the fastening between the center stay-side reinforcing member and the center stay is achieved by three-component co-fastening for the center stay-side reinforcing member, the center stay, and the cross car beam, and/or two-component co-fastening for the center stay-side reinforcing member and the center stay.

More preferably, in the above steering device support structure, the center stay-side reinforcing member is further fastened to the cross car beam, wherein the fastening between the center stay-side reinforcing member and the cross car beam is achieved by three-component co-fastening for the center stay-side reinforcing member, the center stay, and the cross car beam, and/or two-component co-fastening for the center stay-side reinforcing member and the cross car beam.

More preferably, in the above steering device support structure, the cross car beam has a rectangular shape in cross-sectional view, wherein the rectangular shape has a top surface, a bottom surface, a front surface and a rear surface, and wherein the planar portion of the cross car beam is formed in the rear surface of the cross car beam, and the center stay-side reinforcing member has an extension portion extending from the top surface to the bottom surface of the cross car beam so as to form an angular C-shaped surrounding portion which covers the planner portion formed in the rear surface of the cross car beam, a part of the top surface of the cross car beam, and a part of the bottom surface of the cross car beam.

Preferably, in the steering device support structure of the present invention, the vehicle is an automobile, wherein the given axial direction of the cross car beam is a direction extending in a direction identical to a width direction of the automobile.

DETAILED DESCRIPTION OF PREFERRED EMBODIMENTS OF THE INVENTION

[Steering Device Support Structure]

A steering device support structure of the present invention is a structure for supporting a steering device of a vehicle. In this specification, the term "vehicle" is used as a concept encompassing not only vehicles such as automobiles, buses, trucks and electric trains (railroad vehicles), but also any other vehicle (transporter) equipped with a steering device. For example, the term "vehicle" includes airplanes and marine vessels.

In this specification, the term "collision performance" primarily means performance based on mechanical performance (particularly, rigidity) of a cross car beam, more specifically, capability allowing a cross car beam to become less likely to reach cross-sectional breaking, even when receiving a force from a front end of the vehicle due to collision (collision resistance performance).

Further, the term "steering device vibration performance" means capability of preventing a vibration input to the steering device support structure from being transmitted to a steering device in the vehicle, thereby reducing a discomfort feeling which would otherwise be given to passengers such as a driver and a fellow passenger based on vibration. The steering device is a device for steering a vehicle, and, in the field of automobiles, examples thereof include a steering wheel to be manipulated by a driver.

Figure 1:
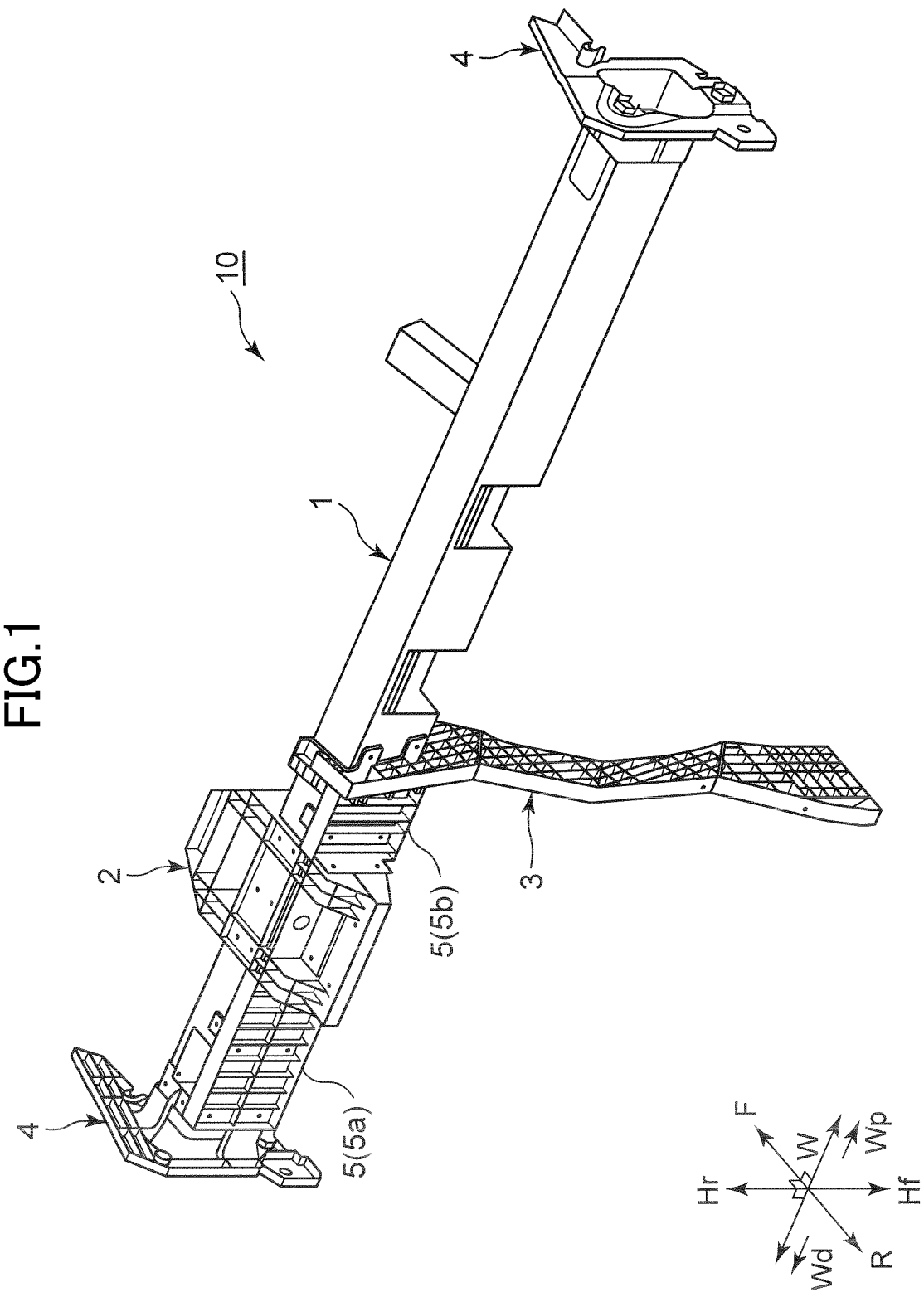
FIG. 1 is a schematic perspective view of a steering device support structure for a vehicle, according to one embodiment of the present invention.
Figure 2A:
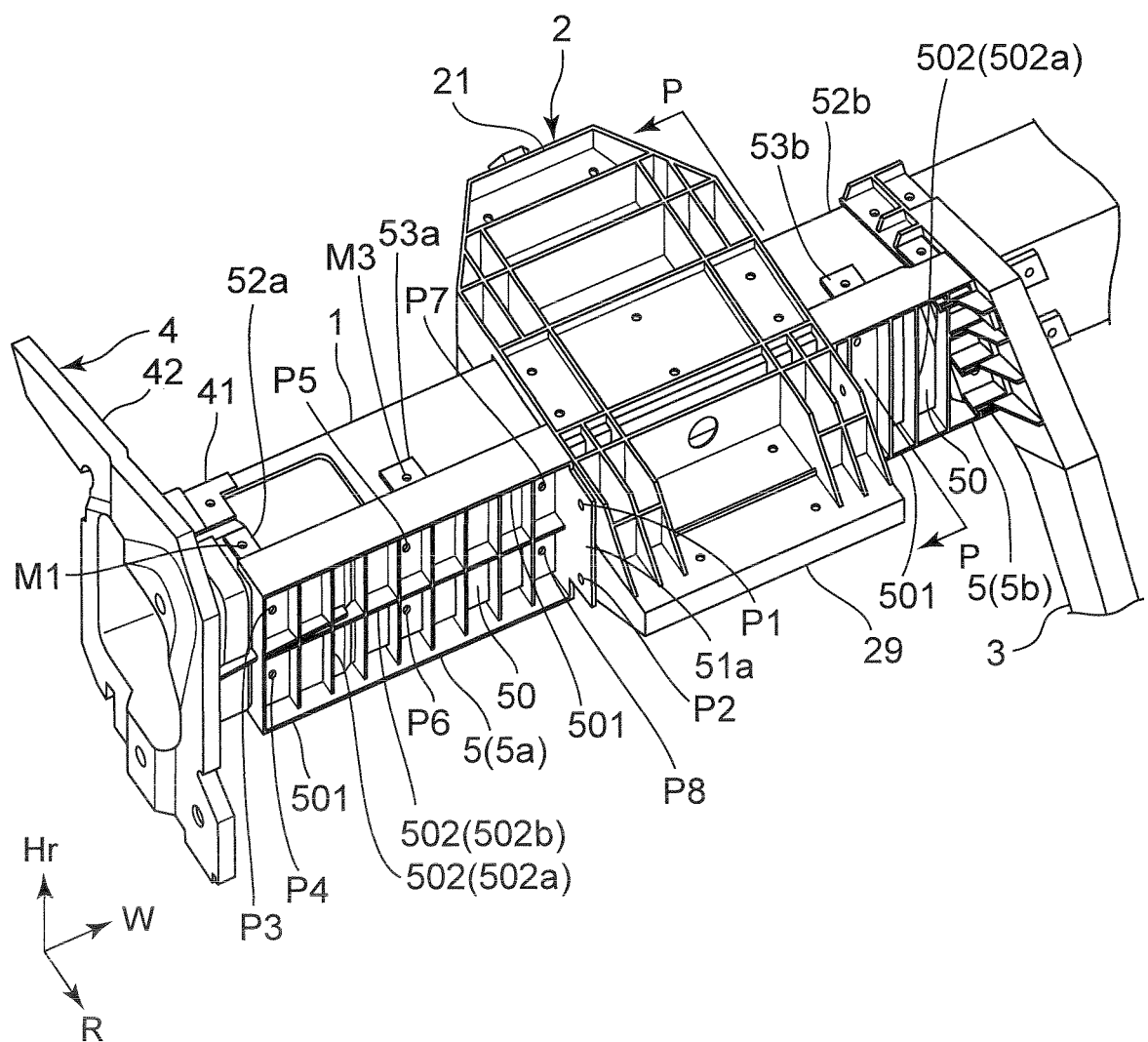
FIG. 2A is an enlarged perspective view of a driver seat-side part of the steering device support structure in FIG. 1.
Figure 2B:
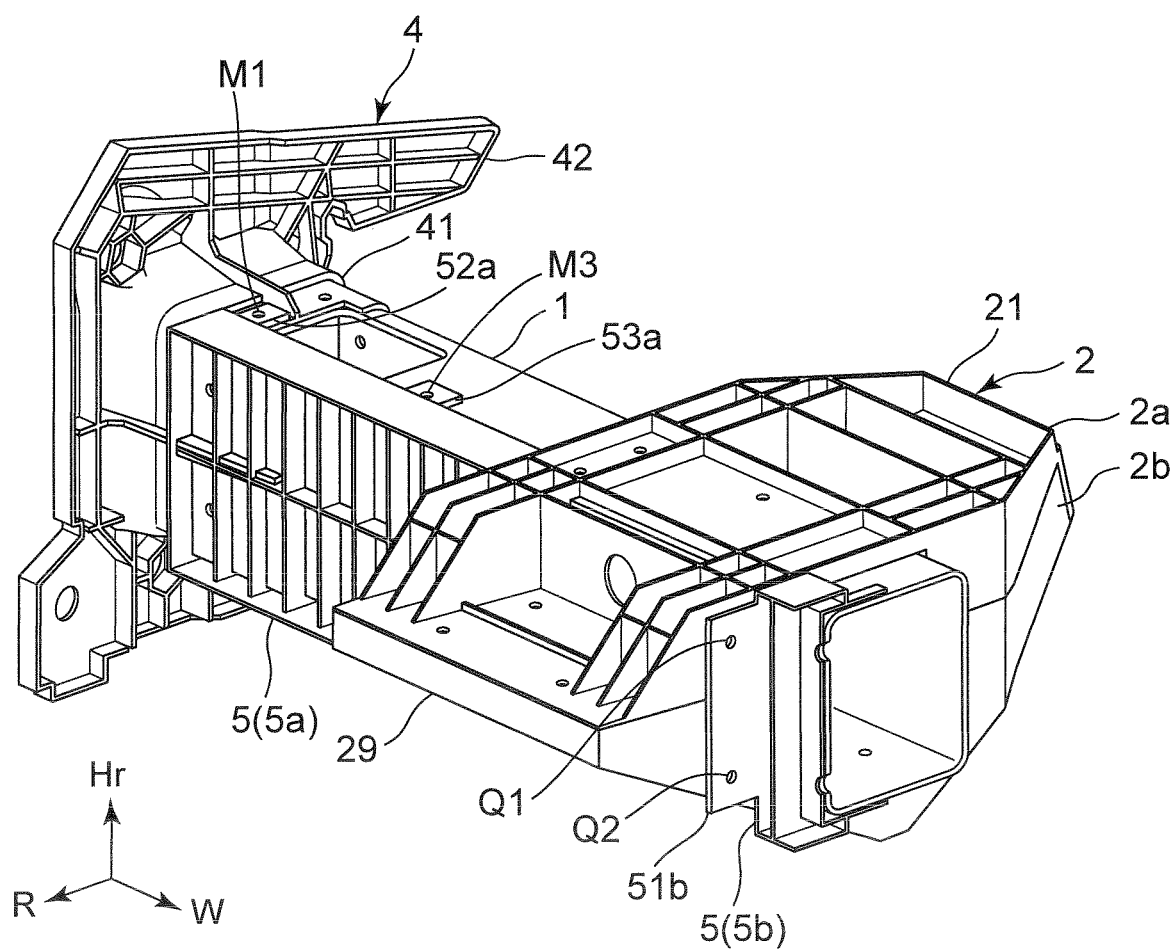
FIG. 2B is a partially enlarged perspective view of the steering device support structure, when viewed along the cross-sectional line P-P of the steering device support structure in FIG. 2A.
Figure 2C:
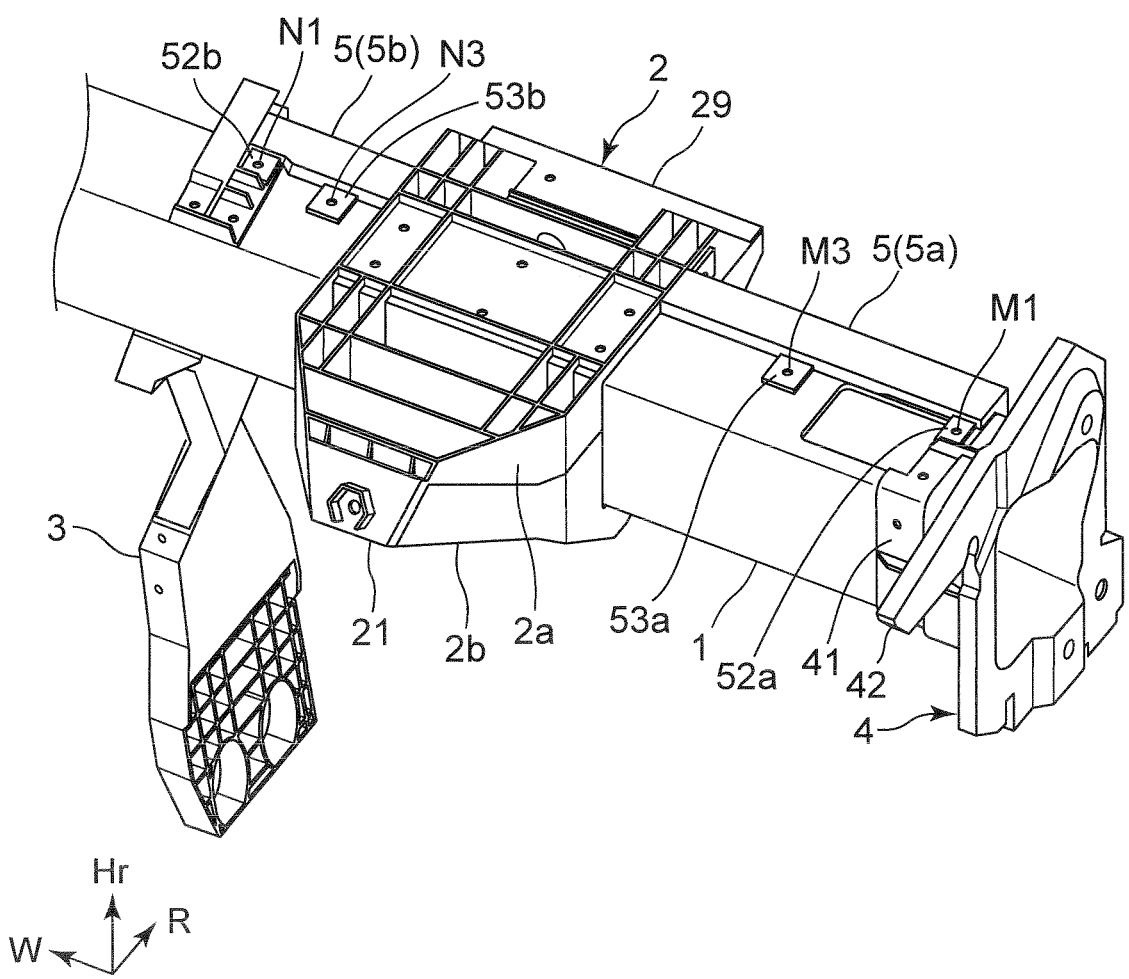
FIG. 2C is an enlarged perspective view of the driver seat-side part of the steering device support structure in FIG. 1.
Figure 2D:
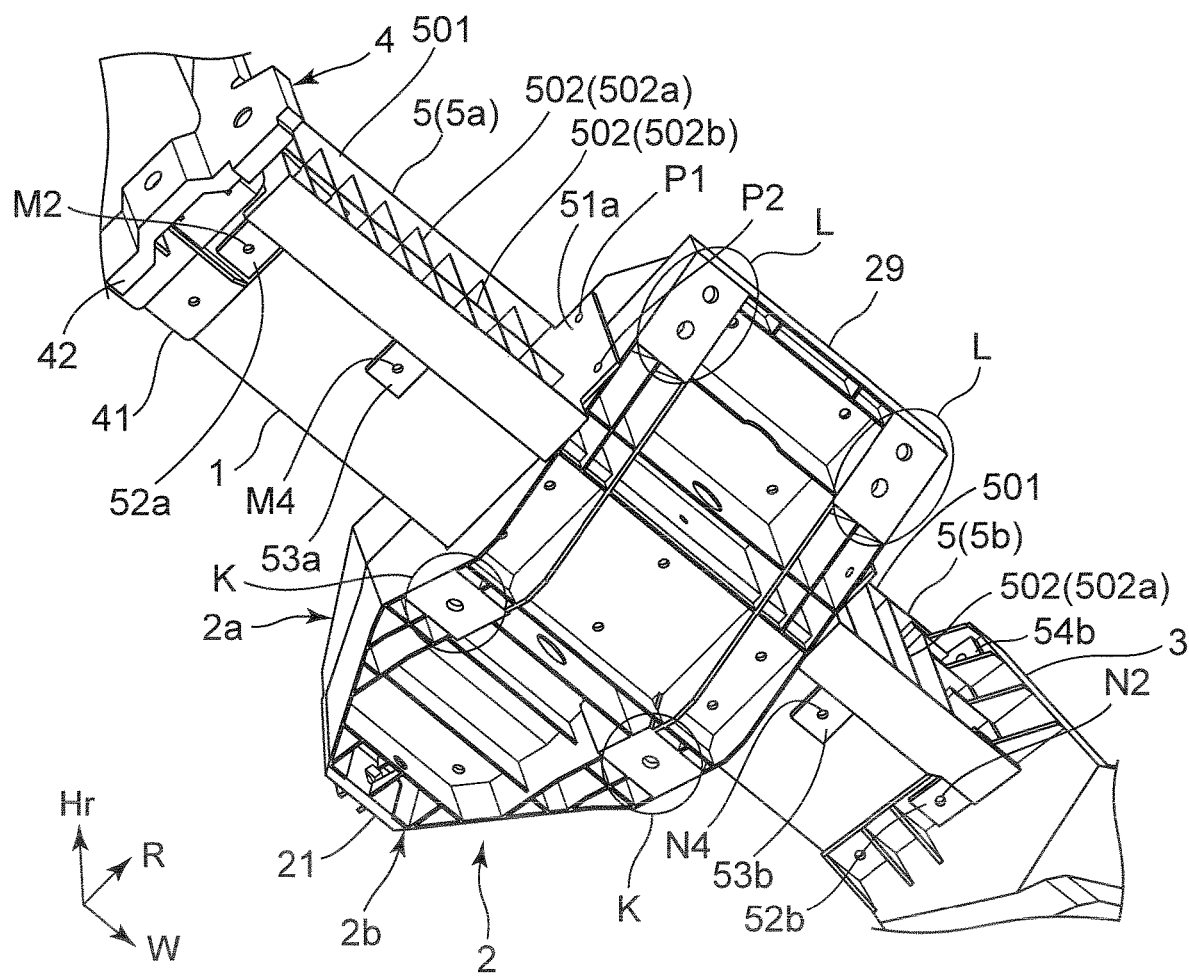
FIG. 2D is an enlarged perspective view of the driver seat-side part of the steering device support structure in FIG. 1.
Figure 3:
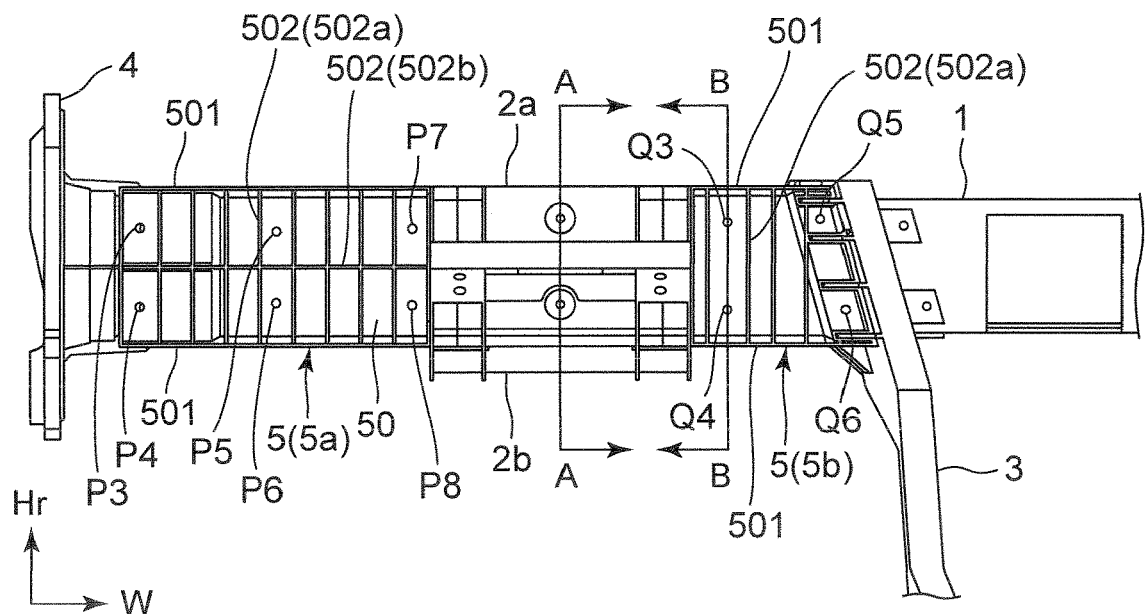
FIG. 3 is an enlarged front view of the driver seat-side part of the steering device support structure in FIG. 1, when viewed forwardly from the side of a rear end of the vehicle.
Figure 4:
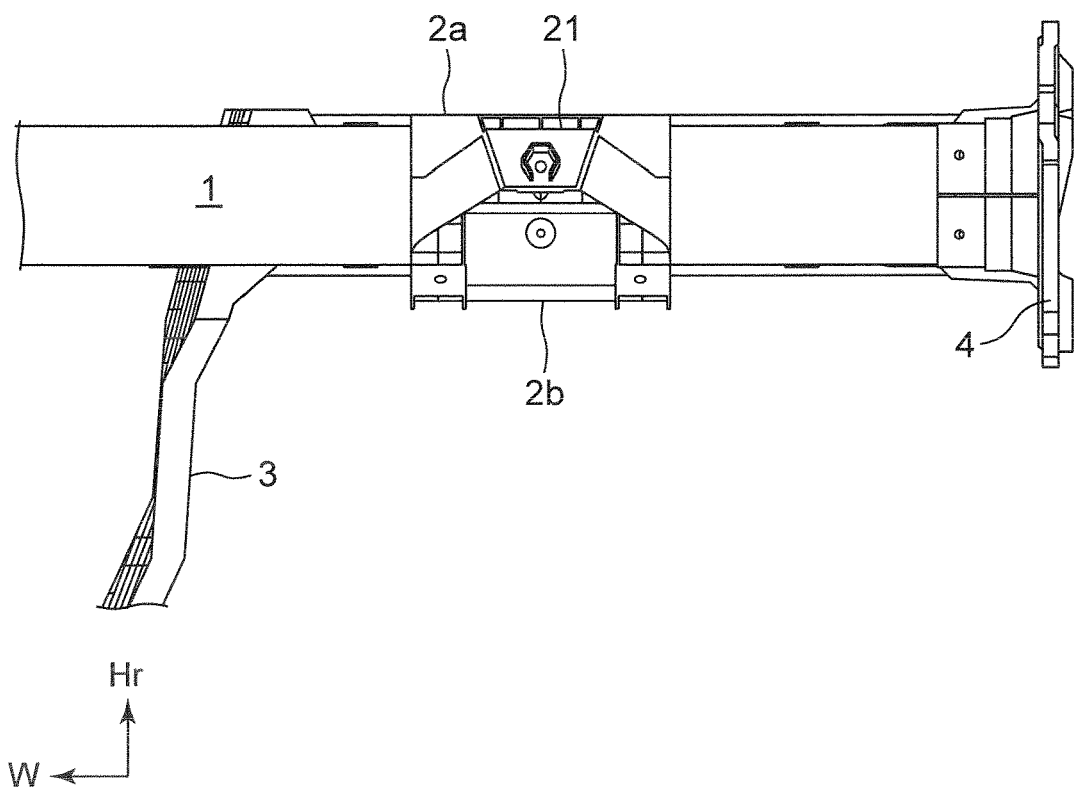
FIG. 4 is an enlarged back view of the driver seat-side part of the steering device support structure in FIG. 1, when viewed rearwardly from the side of a front end of the vehicle.
Figure 5A:
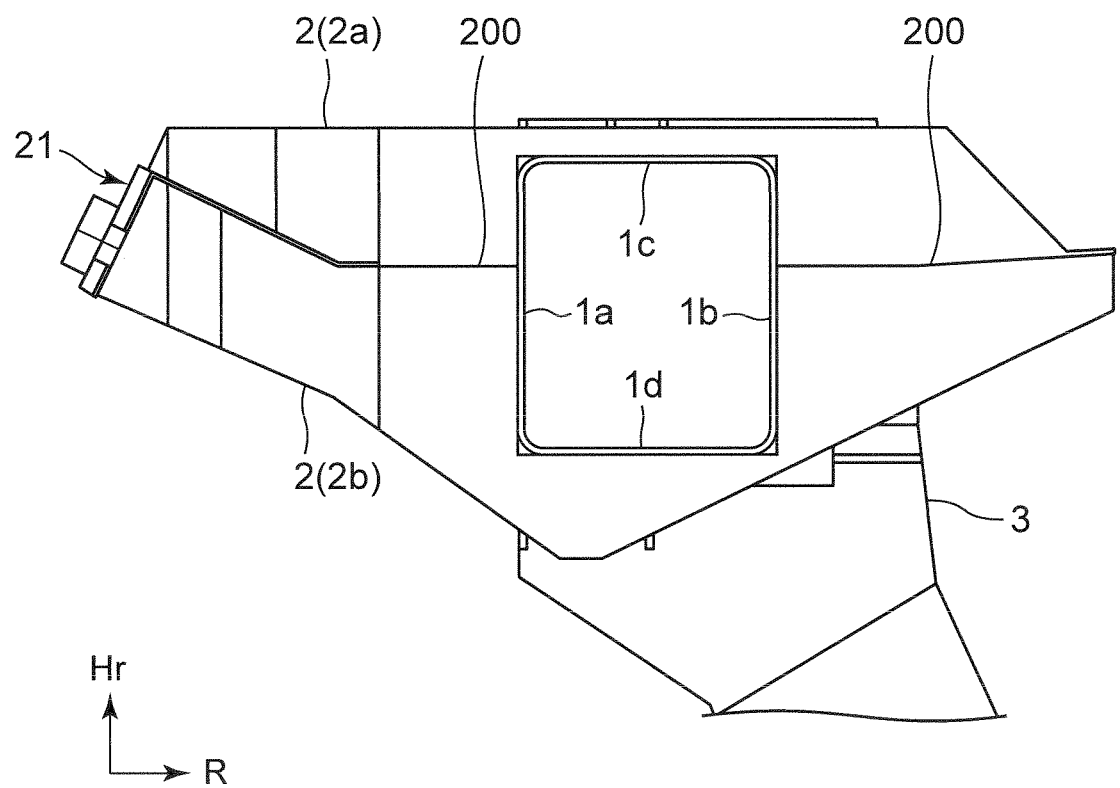
FIG. 5A is a schematic sectional view of the steering device support structure taken along the line A-A in FIG. 3.
Figure 5B:
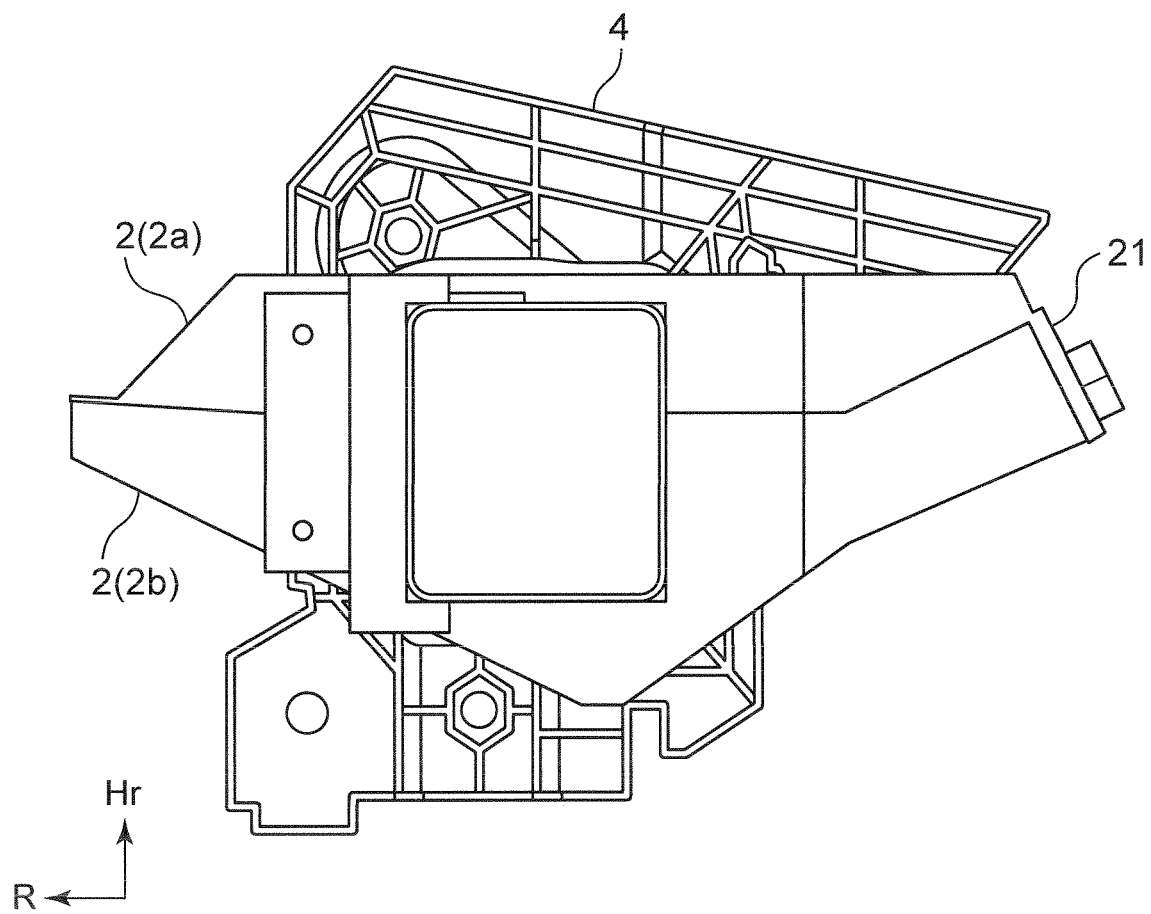
FIG. 5B is a schematic sectional view of the steering device support structure taken along the line B-B in FIG. 3.
Figure 6A:
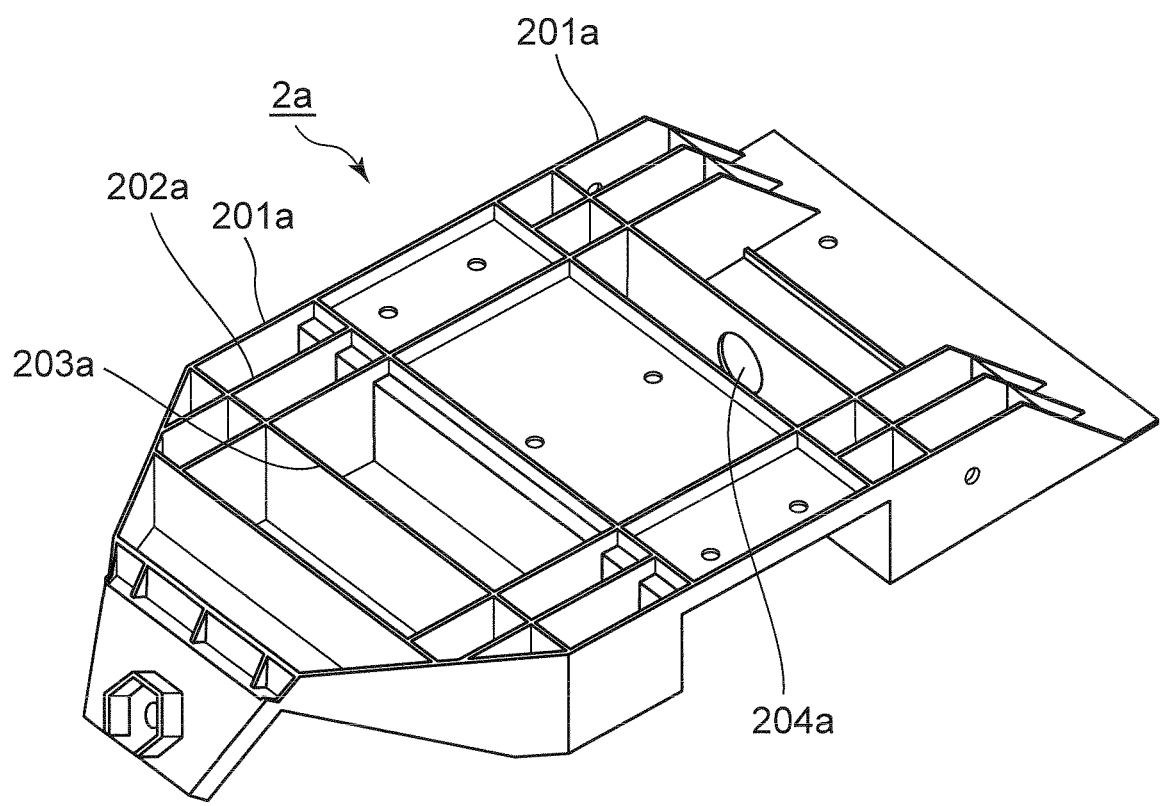
FIG. 6A is a perspective view of an upper segment of a steering device support member used in the steering device support structure in FIG. 1.
Figure 6A:
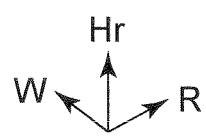
Figure 6B:
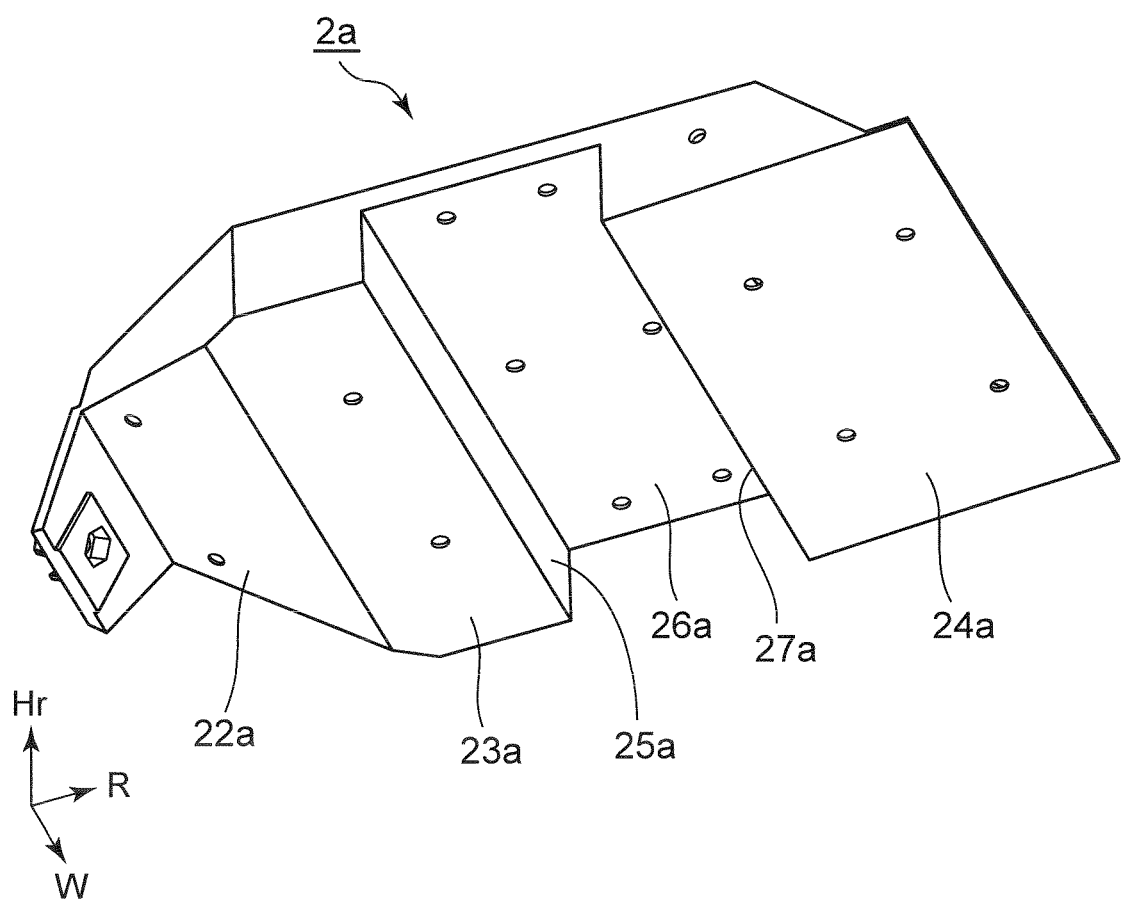
FIG. 6B is a perspective view of a lower segment of the steering device support member used in the steering device support structure in FIG. 1.
Figure 6C:
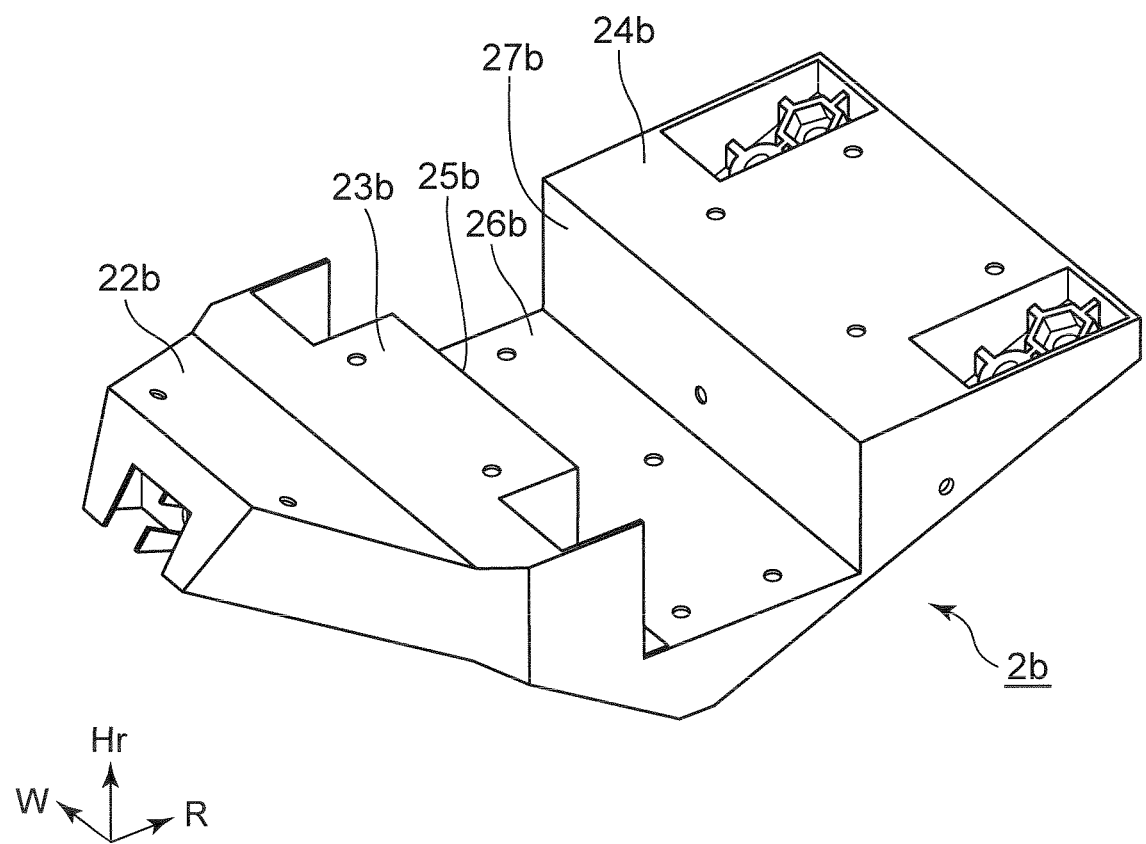
FIG. 6C is a perspective view of the lower segment of the steering device support member used in the steering device support structure in FIG. 1.
Figure 6D:
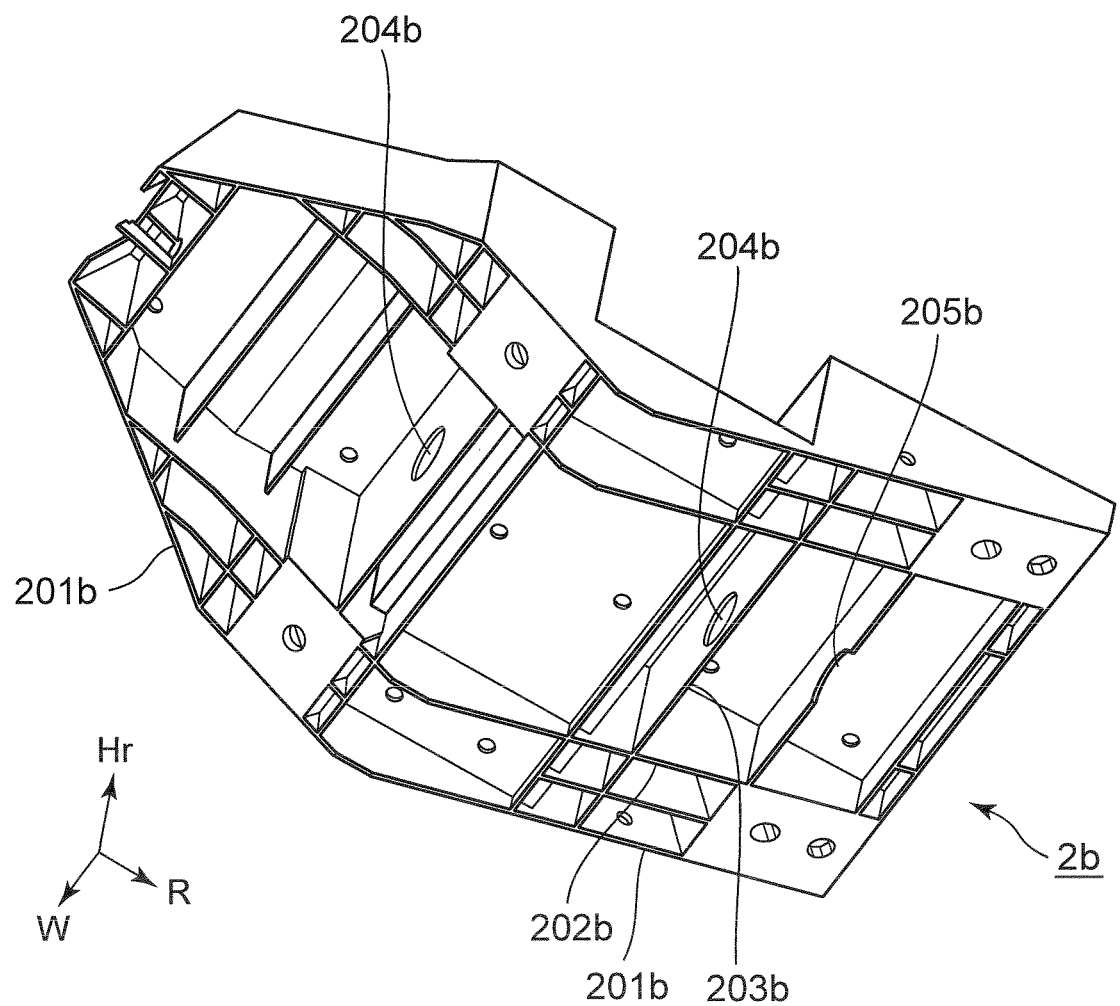
FIG. 6D is a perspective view of a lower segment of the steering device support member used in the steering device support structure in FIG. 1.
Figure 6E:
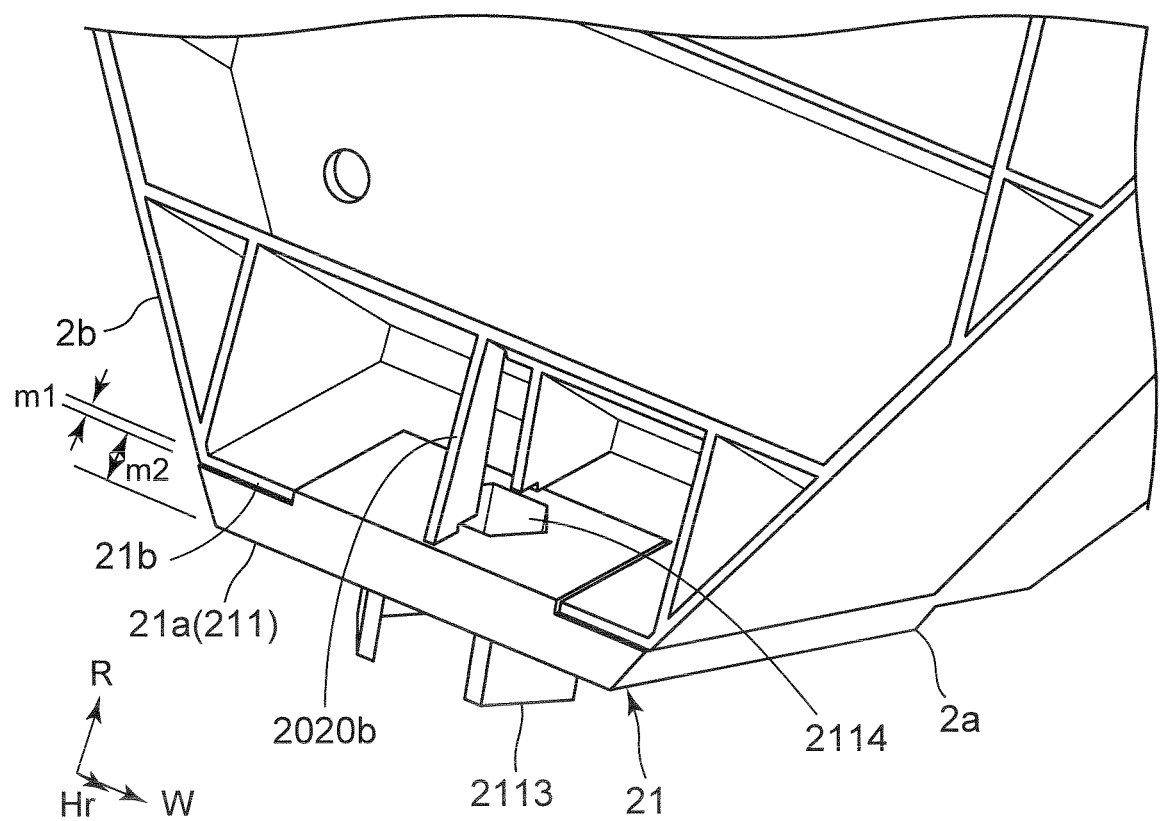
FIG. 6E is a partially enlarged perspective view of the steering device support member used in the steering device support structure in FIG. 1.
Figure 6F:
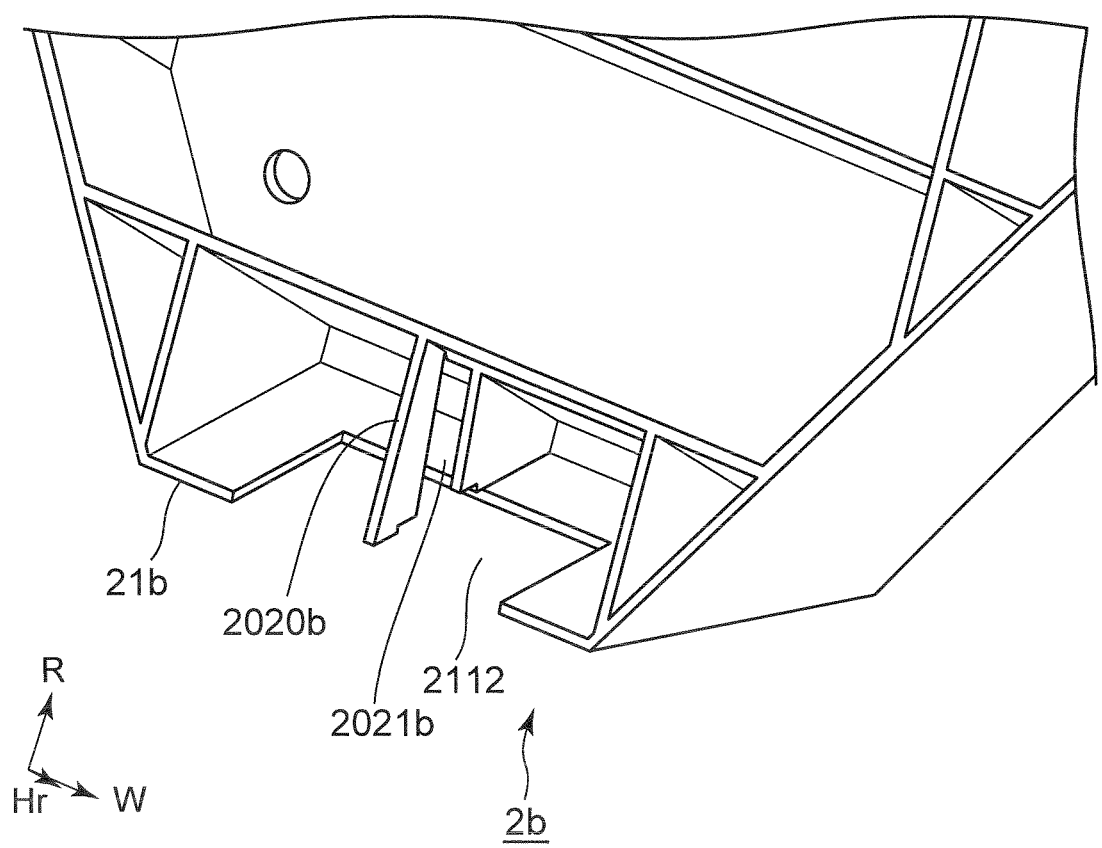
FIG. 6F is a partially enlarged perspective view of the lower segment of the steering device support member used in the steering device support structure in FIG. 1.
Figure 6G:
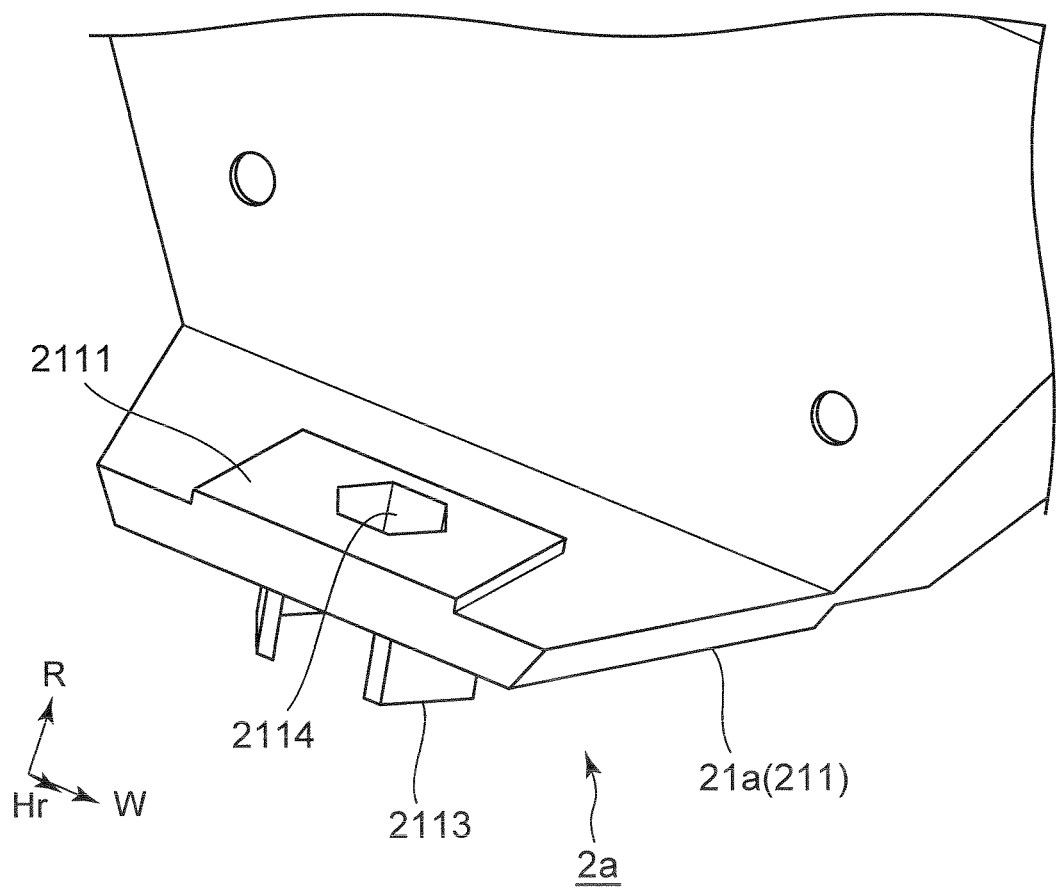
FIG. 6G is a partially enlarged perspective view of an upper segment of the steering device support member used in the steering device support structure in FIG. 1.
Figure 7A:
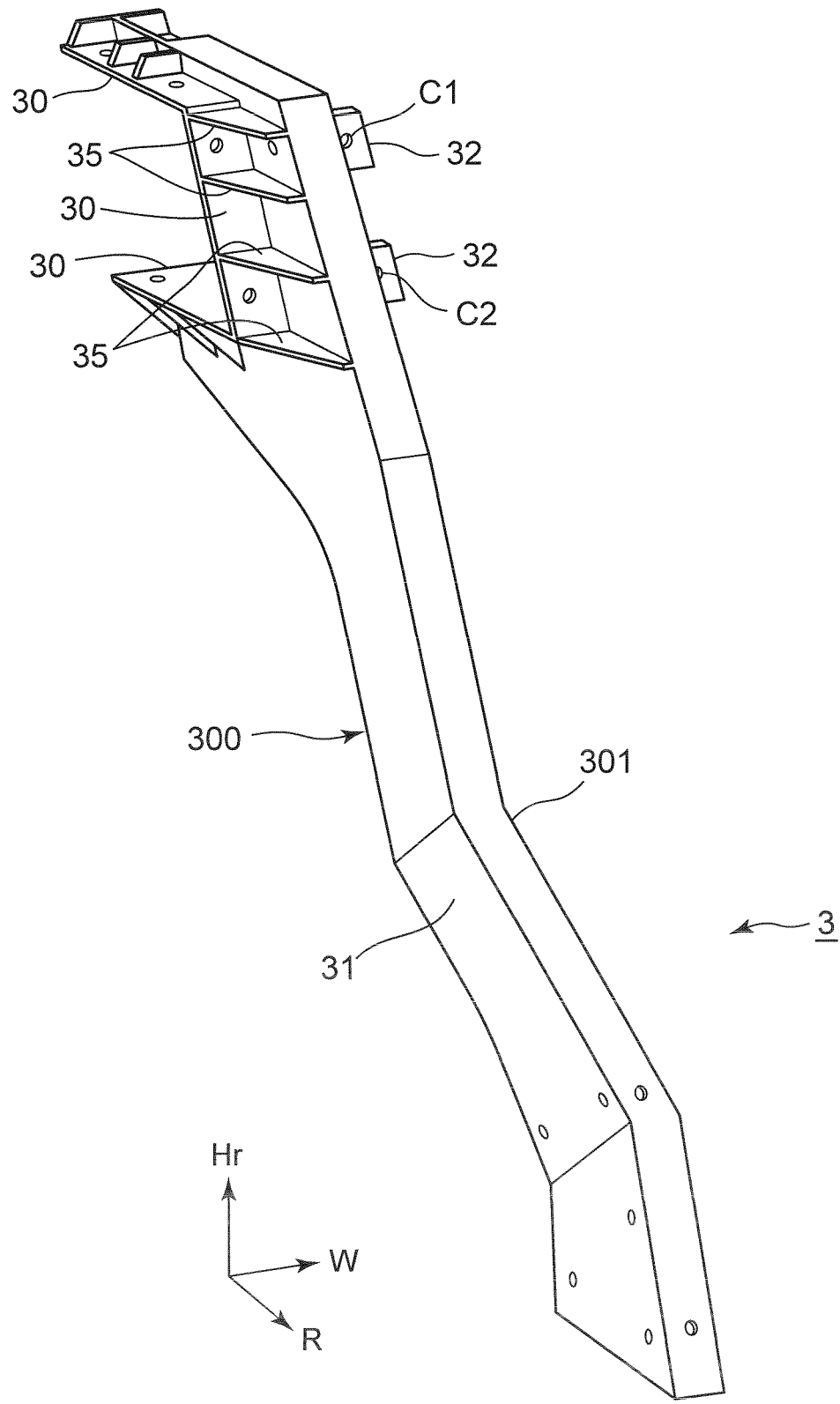
FIG. 7A is a schematic perspective view of a center stay used in the steering device support structure in FIG. 1.
Figure 7B:
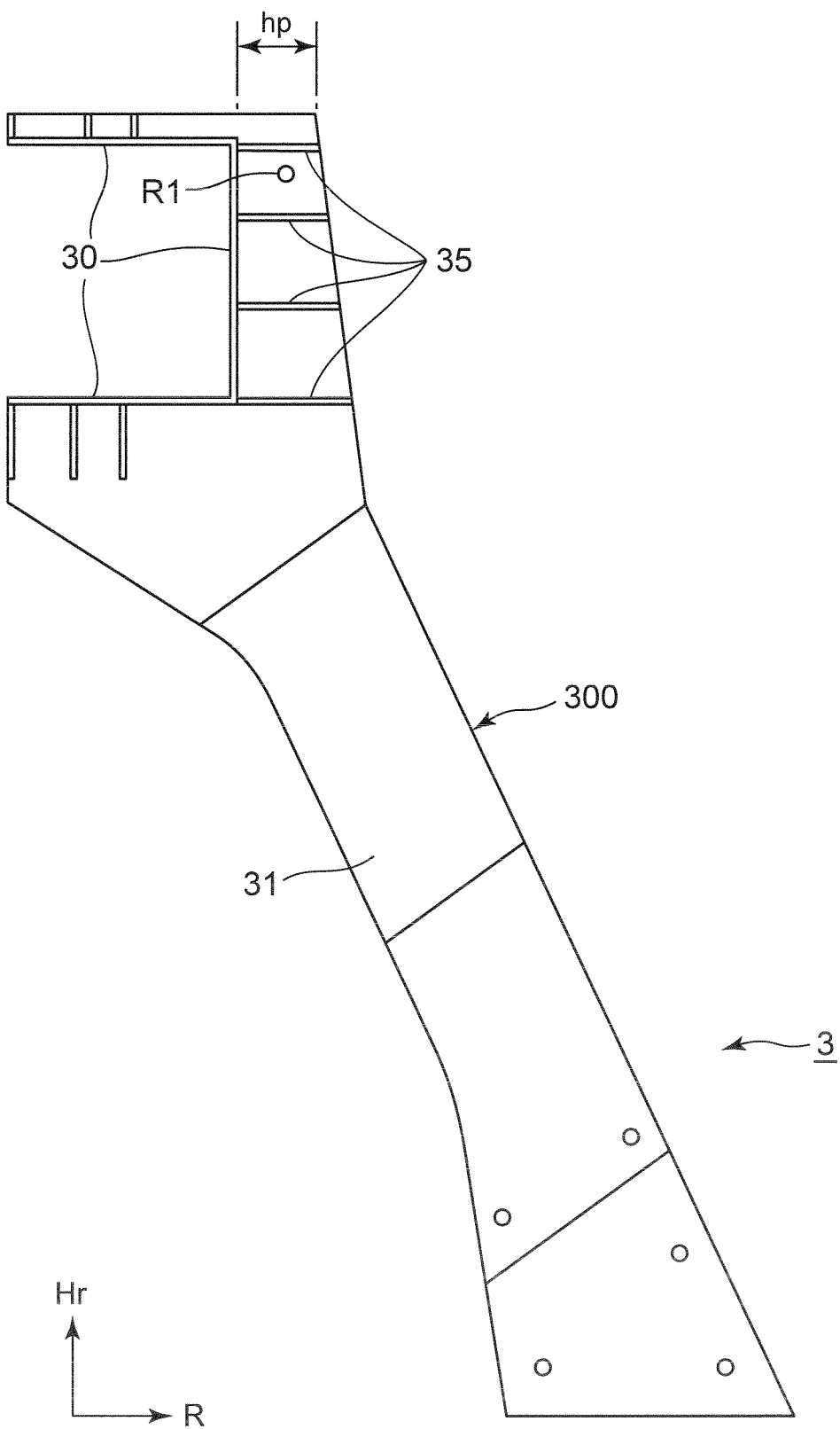
FIG. 7B is a left side view of the center stay used in the steering device support structure in FIG. 1, when viewed from the side of a driver seat.
Figure 7C:
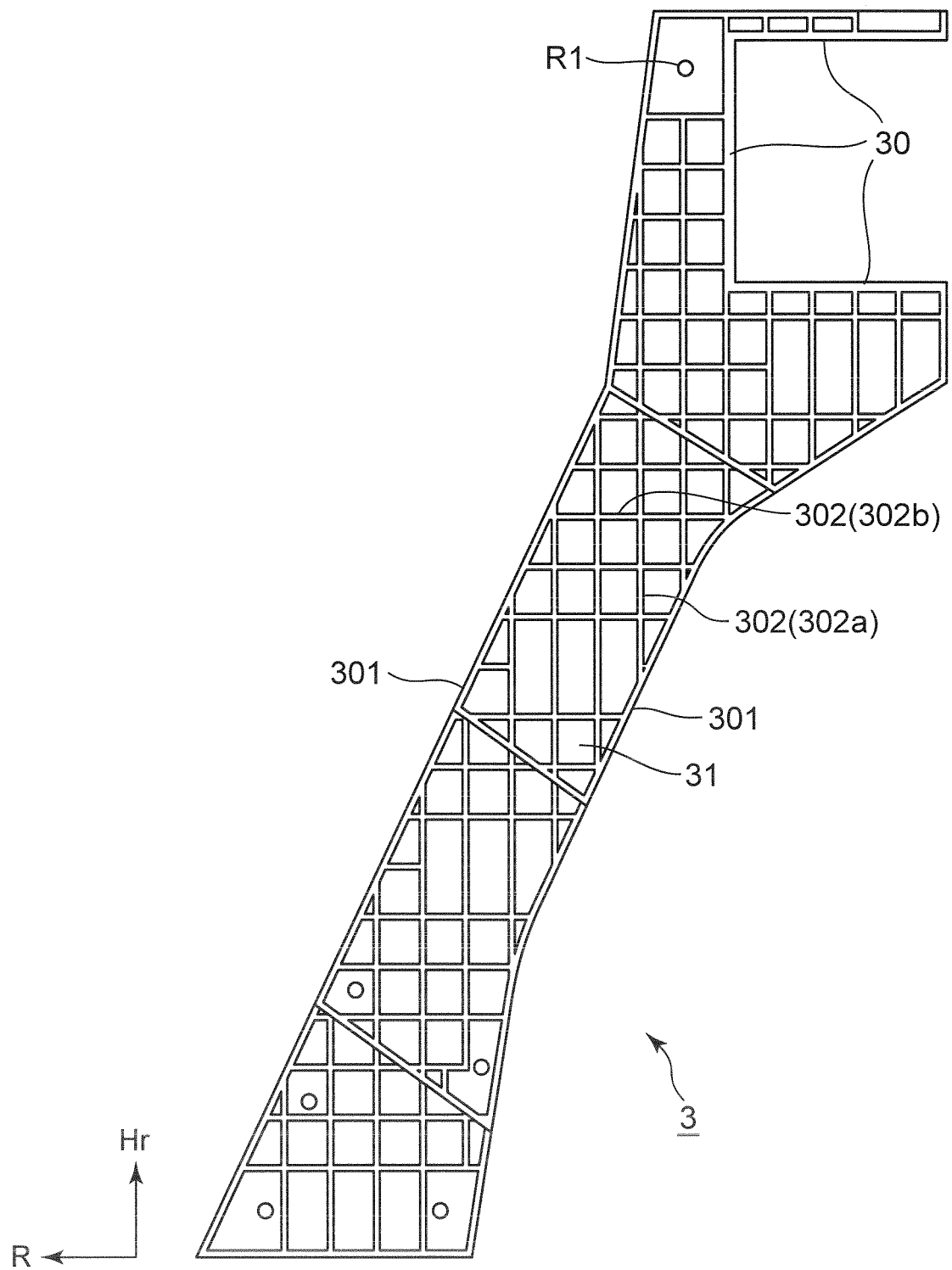
FIG. 7C is a right side view of the center stay used in the steering device support structure in FIG. 1, when viewed from the side of a front passenger seat.
Figure 8:
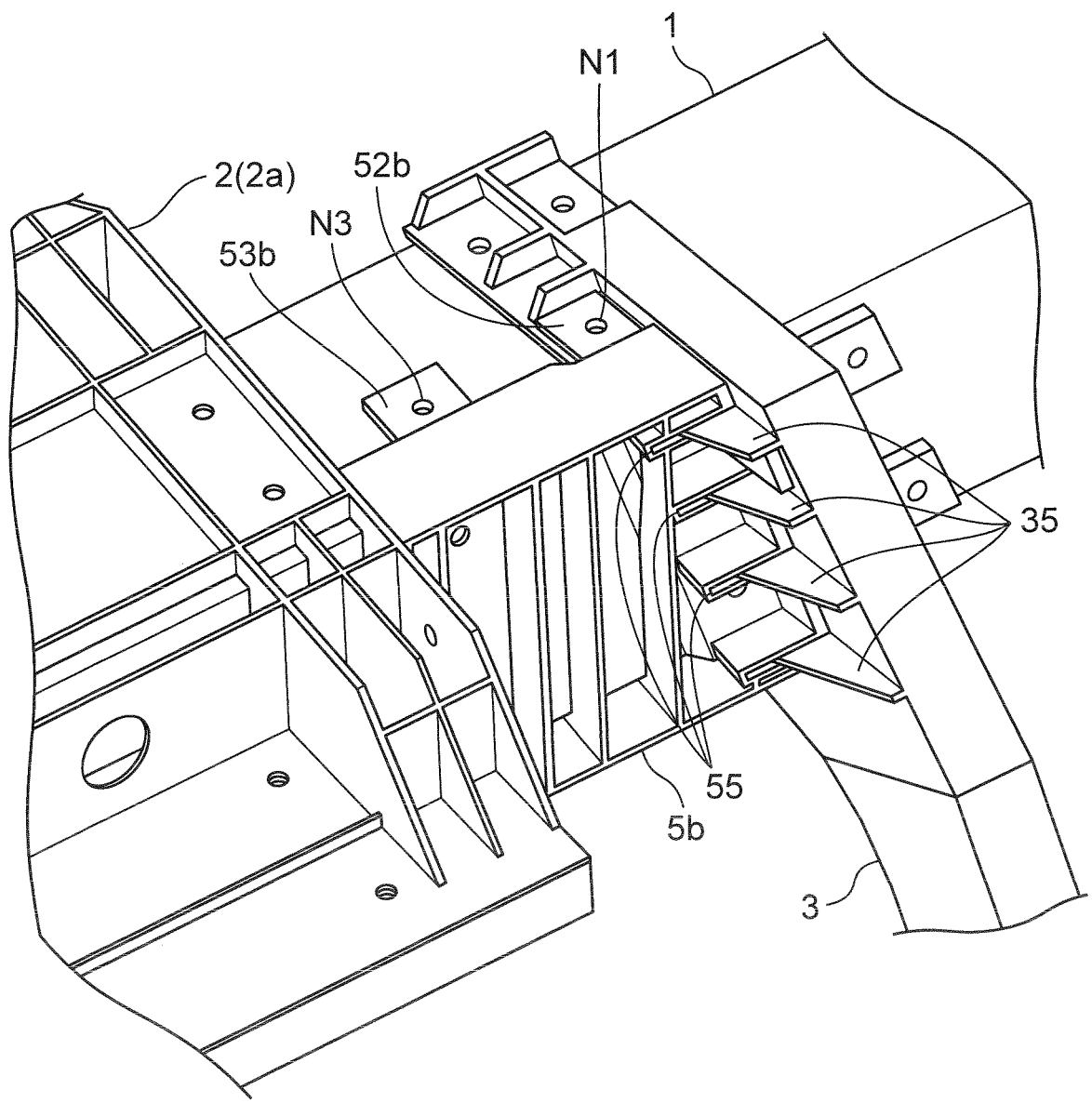
FIG. 8 is a partially enlarged perspective view of a center stay-side reinforcing member of the steering device support structure in FIG. 1 and its vicinity.
Figure 9:
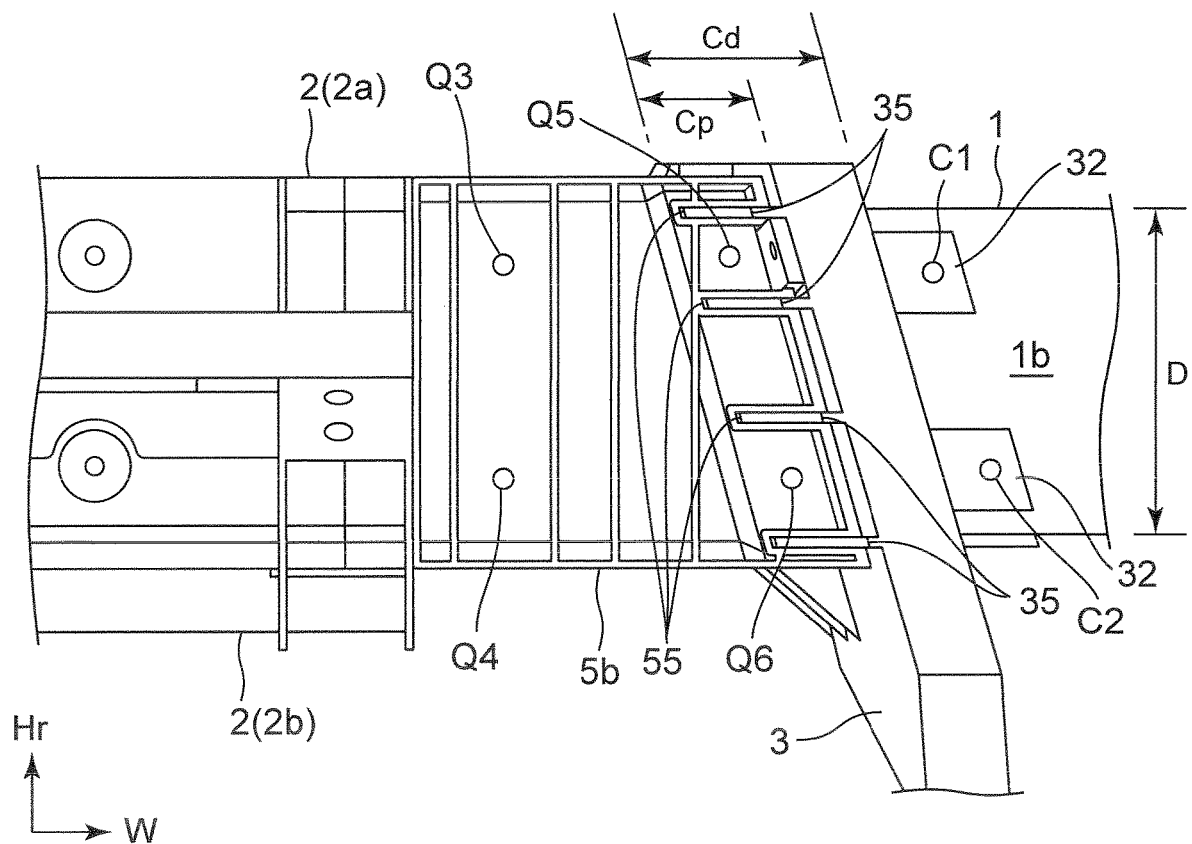
FIG. 9 is a partially enlarged front view of the center stay-side reinforcing member of the steering device support structure in FIG. 1 and the vicinity, when viewed forwardly from the side of the rear end of the vehicle.
Figure 10A:
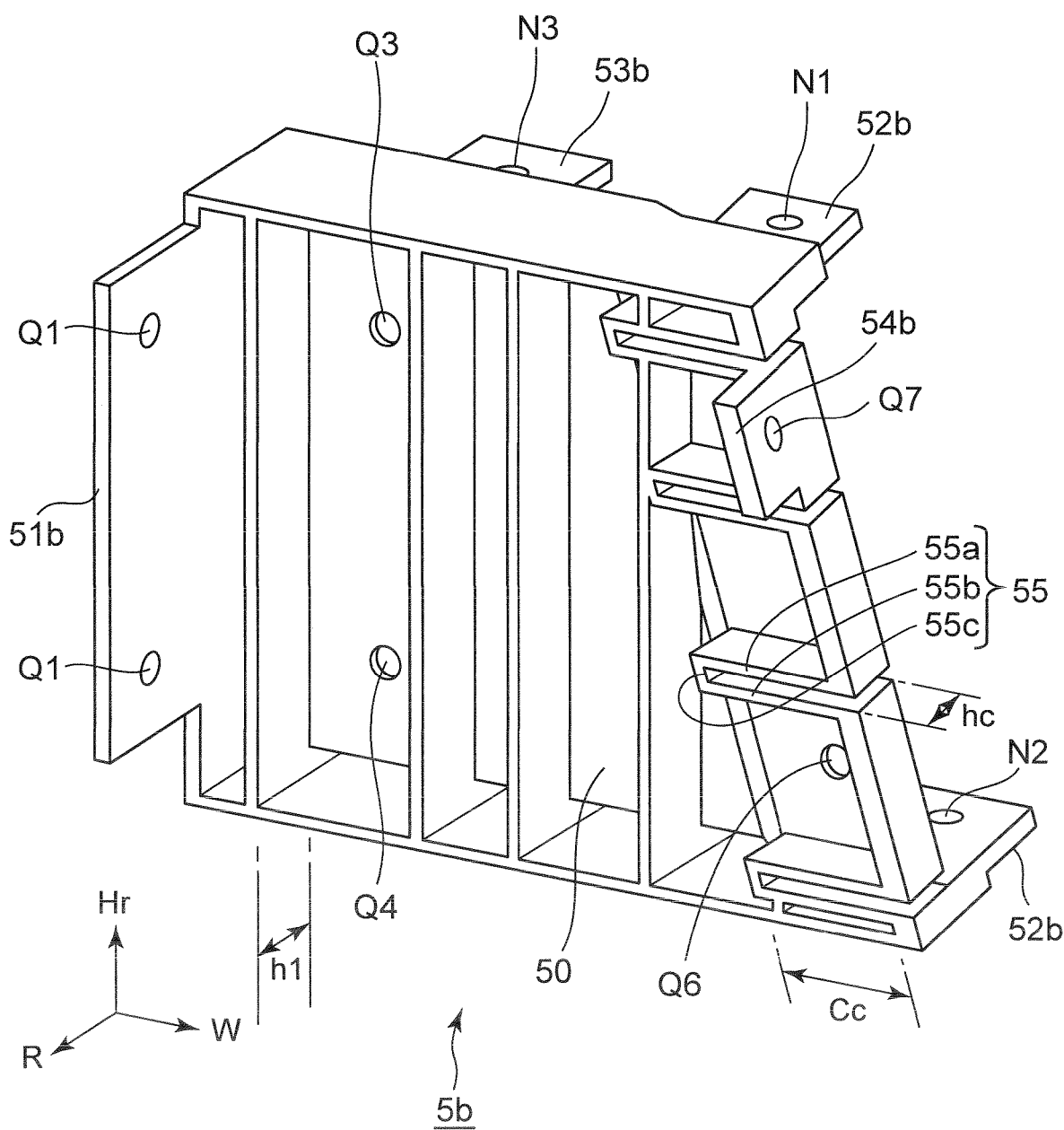
FIG. 10A is an enlarged perspective view of the center stay-side reinforcing member used in the steering device support structure in FIG. 1.
Figure 10B:
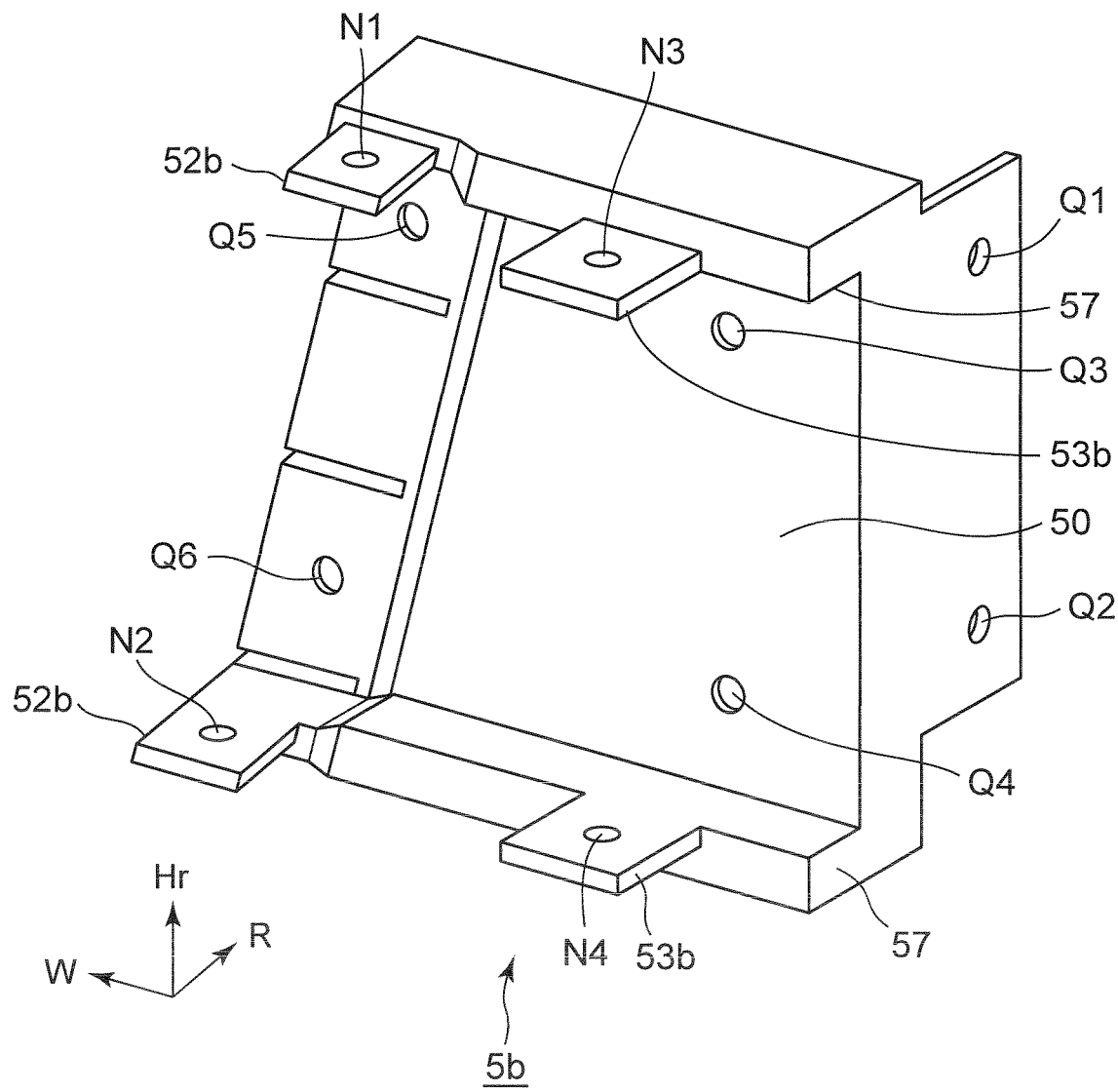
FIG. 10B is an enlarged perspective view of the center stay-side reinforcing member used in the steering device support structure in FIG. 1.

With reference to the drawings, a steering device support structure for a vehicle according to one embodiment of the present invention will now be described. This embodiment will be described based on an example in which the steering device support structure of the present invention is applied to an automobile. FIG. 1 is a schematic perspective view depicting the steering device support structure according to this embodiment. FIG. 2A is an enlarged perspective view of a driver seat-side part of the steering device support structure in FIG. 1. FIG. 2B is a partially enlarged perspective view of the steering device support structure, when viewed along the cross-sectional line P-P of the steering device support structure in FIG. 2A. FIGS. 2C and 2D are enlarged perspective views of the driver seat-side part of the steering device support structure in FIG. 1. FIG. 3 and FIG. 4 are, respectively, an enlarged front view of the driver seat-side part of the steering device support structure in FIG. 1, when viewed forwardly from the side of a rear end of the vehicle, and an enlarged back view of the driver seat-side part of the steering device support structure in FIG. 1, when viewed rearwardly from the side of a front end of the vehicle. FIG. 5A and FIG. 5B are, respectively, a schematic sectional view of the steering device support structure taken along the line A-A in FIG. 3, and a schematic sectional view of the steering device support structure taken along the line B-B in FIG. 3. FIGS. 6A and 6B are perspective views of an upper segment of a steering device support member used in the steering device support structure in FIG. 1. FIGS. 6C and 6D are perspective views of a lower segment of the steering device support member used in the steering device support structure in FIG. 1. FIG. 6E is a partially enlarged perspective view of the steering device support member used in the steering device support structure in FIG. 1. FIG. 6F and FIG. 6G are, respectively, partially enlarged perspective views of the lower segment and the upper segment of the steering device support member used in the steering device support structure in FIG. 1. FIG. 7A is a schematic perspective view of a center stay used in the steering device support structure in FIG. 1. FIG. 7B and FIG. 7C are, respectively, a left side view of the center stay used in the steering device support structure in FIG. 1, when viewed from the side of a driver seat, and a right side view of the center stay used in the steering device support structure in FIG. 1, when viewed from the side of a front passenger seat. FIG. 8 is a partially enlarged perspective view of a center stay-side reinforcing member of the steering device support structure in FIG. 1 and its vicinity. FIG. 9 is a partially enlarged front view of the center stay-side reinforcing member of the steering device support structure in FIG. 1 and the vicinity, when viewed forwardly from the side of the rear end of the vehicle. FIGS. 10A and 10B are enlarged perspective views of the center stay-side reinforcing member used in the steering device support structure in FIG. 1.

In the figures, the arrowed line F denotes a forward direction of the vehicle (vehicle forward direction) and the arrowed line R denotes a rearward direction of the vehicle (vehicle rearward direction). The arrowed line W denotes a width direction of the vehicle (vehicle width direction). The arrowed line Wd denotes one direction of the vehicle width direction W oriented from a front passenger seat side to a driver seat side in which an aftermentioned steering device support member is disposed (front passenger seat-to-driver seat direction), and the arrowed line Wp denotes the other direction of the vehicle width direction W oriented from the driver seat side to the front passenger seat side (driver seat-to-front passenger seat direction Wp). The arrowed line Hr denotes one direction of a height direction of the vehicle (vehicle height direction) oriented from a floor to a roof of the vehicle (floor-to-roof direction), and the arrowed line Hf denotes the other direction of the vehicle height direction oriented from the roof to the floor of the vehicle (roof-to-floor direction). It should be noted that various elements depicted in the figures are schematically shown only for the sake of facilitating understanding of the present invention, and a dimensional ratio, an external appearance or the like can be different from that of an actual structure. The term "upward-downward direction" used directly or indirectly in this specification corresponds, unless otherwise specified, to an upward-downward direction in a state in which the steering device support structure is incorporated in a vehicle. A common reference sign in the figures denotes, unless otherwise specified, the same member, region, dimension or area.

The steering device support structure 10 according to this embodiment comprises a cross car beam 1, a steering device support member 2, a center stay 3, and a reinforcing member 5, and, in typical cases, further comprises two side brackets 4. The steering device support structure 10 according to this embodiment has the reinforcing member 5 which will be described in detail later, so that it is possible to convert torsional stress input to the steering device support structure 10, into flexural stress. Specifically, torsional stress caused by a force based on vibration or the like input to the steering device support structure 10 can be converted into flexural stress to be born by the entirety of the steering device support structure 10 (particularly, a part of the steering device support structure 10 reinforced by the reinforcing member 5). More specifically, in a steering device support structure devoid of the reinforcing member 5, due to a force input thereto based on vibration or the like, torsional deformation is more likely to occur in an axial direction of a cross car beam of the steering device support structure, and therefore the vibration is transmitted to a passenger in a relatively highly perceivable manner.

Differently, in the steering device support structure 10 having the reinforcing member 5, even when a force is input thereto based on vibration or the like, torsional deformation is less likely to occur, and therefore the steering device support structure 10 (particularly, the part of the steering device support structure 10 reinforced by the reinforcing member 5) will undergo flexural deformation in its entirety. This makes it possible to sufficiently prevent transmission of the vibration to a passenger to thereby sufficiently improve the steering device vibration performance. Examples of the vibration include: a traveling vibration input from the ground during traveling; an engine vibration input from an engine compartment during engine running; and a vibration input from a drive-train and a braking system.

(Cross Car Beam)

The cross car beam 1 has a given axial direction (which is identical to the vehicle width direction W). The cross car beam 1 is a member extending along its axial direction, and comprises a planar portion extending over approximately the entirety of the cross car beam 1 in the axial direction thereof. This planner portion enables the steering device support structure to be improved in the collision performance.

The shape of the cross car beam 1 in a cross-sectional view taken along a plane perpendicular to the axial direction of the cross car beam 1 (cross-sectional shape of the cross car beam 1) is not particularly limited, as long as the cross car beam 1 has the planner portion. For example, the cross-sectional shape of the cross car beam 1 may be a semicircular or sectoral shape, or may be a polygonal shape including a rectangular shape. From a viewpoint of a further improvement in the collision performance and the steering device vibration performance, the cross-sectional shape of the cross car beam 1 is preferably a rectangular shape. As used herein, the term "rectangular shape" has a concept encompassing a square shape and an elongated rectangular shape (rectangular shape except for a square shape). From the above viewpoint, the square shape is preferable. When the cross-sectional shape of the cross car beam 1 is a rectangular shape, the cross car beam 1 has a rectangular columnar shape in its entirety. The rectangular columnar shape also includes a case where the cross car beam 1 has a rectangular shape in cross-section, wherein the cross car beam 1 is formed as a hollow body, as will be described later.

The location of the planar portion of the cross car beam 1 covered by the reinforcing member 5 is not particularly limited. For example, in the case where the cross car beam 1 has a rectangular shape as a cross-sectional shape, the location may be one or more surfaces selected from the group consisting of a front surface, a rear surface, a top surface, and a bottom surface of the cross car beam 1. The front surface, the rear surface, the top surface and the bottom surface of the cross car beam 1 means, respectively, a surface oriented in the vehicle forward direction (F), a surface oriented in the vehicle rearward direction (R), a surface oriented in the floor-to-roof direction (Hr), and a surface oriented in the roof-to-floor direction (Hf), and are denoted, respectively, by the reference signs 1a, 1b, 1c and 1d, for example, in FIG. 5A. As depicted in FIG. 1, etc., from the viewpoint of a further improvement in the steering device vibration performance, it is preferable that the location of the planner portion of the cross car beam 1 covered by the reinforcing member 5 includes at least the rear surface of the cross car beam 1, and, from a viewpoint of a further reduction in weight, it is more preferable that the planner portion is formed in only the rear surface. The cross car beam 1 is typically disposed such that the axial direction thereof becomes parallel to the vehicle width direction.

The cross car beam 1 is preferably formed as a hollow body. This makes it possible to achieve a further reduction in weight of the steering device support structure. A material for the hollow body is not particularly limited. For example, the material may be a metal such as aluminum, iron, steel or an alloy thereof, or may be a resin such as a polymer, or a fiber-reinforced resin. From a viewpoint of a balance between a further reduction in weight and a further improvement in the collision performance and the steering device vibration performance, the material for the hollow body is preferably a fiber-reinforced resin.

The fiber-reinforced resin hollow body is a body impregnated with a curable resin and formed in an elongate shape in its entirety. The fiber-reinforced resin hollow body is not particularly limited, as long as the hollow body comprises a fiber layer containing reinforcement fibers, and a curable resin which has been cured after impregnating the fiber layer. Although the fibers in the resin layer may be uniformly dispersed in the curable resin, the fiber layer preferably comprises an axial fiber layer, from the viewpoint of a further improvement in the collision performance. The axial fiber layer means a fiber layer mainly containing reinforcement fibers oriented parallel to the axial direction (longitudinal direction) of the cross car beam. In this embodiment, the axial fiber layer is preferably a fiber layer consisting only of the reinforcement fibers, from the viewpoint of a further improvement in the collision performance.

As the reinforcement fiber, it is possible to use all types of fibers which have heretofore been used in the field of fiber-reinforced plastics. Examples of the reinforcement fiber include a glass fiber and a carbon fiber. Preferably, the reinforcement fiber is a glass fiber.

As the curable resin, it is possible to use all types of curable resins which have heretofore been used in a fiber-reinforced resin hollow body. Specific examples of the curable resin include thermosetting resins such as unsaturated polyester resin, epoxy resin, vinylester resin, and phenol resin.

The curable resin may contain an additive such as a so-called catalyst, a release agent, a colorant, a shrinkage-reducing agent or a silane coupling agent.

In the case where the cross car beam 1 is formed as a hollow body, a material for the cross car beam 1 may have any thickness, wherein the thickness may be appropriately determined depending on the intended use of the steering device support structure. In the case where the steering device support structure is used in a vehicle, particularly in an automobile, from the viewpoint of a further reduction in weight of the steering device support structure, and a further improvement in the collision performance, the cross car beam 1 has a thickness of typically 1 to 20 mm, particularly 1 to 10 mm, preferably 1 to 3 mm. The thickness means a wall thickness of a material for the cross car beam 1.

The cross car beam 1 may have any outer peripheral length, wherein the outer peripheral length may be appropriately determined depending on the intended use of the steering device support structure. In the case where the steering device support structure is used in a vehicle, particularly in an automobile, the cross car beam 1 has an outer peripheral length of, e.g., 125 to 300 mm. The outer peripheral length of the cross car beam 1 means an outer peripheral length of a cross-section of the cross car beam 1 taken along a plane perpendicular to the axial direction of the cross car beam 1. In the case where the cross car beam 1 has a cross-sectionally rectangular shape, the length of one side of the cross-sectional shape of the cross car beam 1 is not particularly limited. For example, the length may be from 45 to 75 mm.

Preferably, the cross car beam 1 is a draw-formed body. A cross-sectional shape of a draw-formed body is typically constant in its axial direction. Particularly in the case where the cross car beam 1 is formed as the fiber-reinforced resin hollow body, the fiber-reinforced resin hollow body can be produced by the following draw forming process. For example, the draw forming process comprises: impregnating reinforcement fibers forming an axial fiber layer, with a curable resin; drawing the reinforcement fibers impregnated with the curable resin, from one end of a die having a cross-sectional shape equal to that of the hollow body; and sufficiently curing the curable resin within the die by heating. An obtained fiber-reinforced resin hollow body is continuously taken out of the die, and subjected to post-processing, e.g., of cutting the hollow body into a given length by a cutting machine.

The cross car beam 1 is formed with a plurality of fastening holes. These fastening holes are formed at appropriate positions so as to achieve fastening between the cross car beam 1 and each of the steering device support member 2, the center stay 3, the side brackets 4 and the reinforcing member 5.

(Steering Device Support Member)

The steering device support member 2 has a function of supporting the steering device while being supported by the cross car beam 1. The steering device support member 2 is typically configured such that a front end 21 thereof receives a forward-rearward directional (F-R directional) force from a cowl (front portion of a vehicle body of the vehicle) (not depicted). This makes it possible to prevent a forward movement of the cross car beam during collision.

From the viewpoint of a further improvement in the steering device vibration performance, the steering device support member 2 is preferably configured such that the front end 21 thereof is fixed to the cowl or a cowl bracket connected to the cowl. The front end 21 of the steering device support member 2 means one end of the steering device support member 2 on a forwardmost side in the vehicle forward direction F. Typically, the cowl is a member extending in the vehicle width direction to improve the collision performance. For example, in an automobile, the cowl is disposed along a rearwardmost edge of a hood. Fixing between the cowl and the steering device support member may be achieved in a direct manner, or may be achieved in an indirect manner through a rod-shaped cowl bracket.

Although one example of the steering device support member 2 will be shown below, it is apparent that the steering device support member 2 is not limited to the following example as long as it has the aforementioned function. By using the following steering device support member 2, the collision performance is further improved, and accordingly mechanical strength (particularly rigidity) in an input direction of a force from the cowl, and in a direction perpendicular to the input direction is improved. As a result, vibration transmission in the input direction and the perpendicular direction is prevented, and thereby is further improved. Such a steering device vibration performance-improving mechanism based on the steering device support member 2 is different from a steering device vibration performance-improving mechanism based on converting torsional stress to flexural stress by the reinforcing member 5 as in the present invention.

The steering device support member 2 typically comprises an upper segment 2a and a lower segment 2b as depicted in FIGS. 2B, 5A, 5B, etc. The upper segment 2a and the lower segment 2b are arranged such that the cross car beam 1 is clamped by the two segments 2a, 2b, and fixed to the cross car beam 1. In the case where the steering device support member 2 is fixed in the above manner, it is preferable to configure the steering device support member 2 as depicted in FIG. 5A, from the viewpoint of a further improvement in the collision performance and the steering device vibration performance. Specifically, in a cross-section of the cross car beam 1 taken along a plane perpendicular to the axial direction thereof, a parting line (boundary line) 200 between the upper segment 2a and the lower segment 2b is preferably formed to intersect with the front and rear surfaces 1a, 1b as depicted in FIG. 5A. More specifically, the parting line (boundary line) 200 is preferably formed such that each of the upper segment 2a and the lower segment 2b comes into contact with respective parts of the front and rear surfaces 1a, 1b of the cross car beam 1. In more preferred embodiment, the parting line (boundary line) 200 is formed such that each of the upper segment 2a and the lower segment 2b comes into surface contact with 20% or more (preferably, 30% or more) of "the front surface 1a of the cross car beam 1", and 20% or more (preferably, 30% or more) of "the rear surface 1b of the cross car beam 1". In calculation of such an area percentage, the area of "the front surface 1a of the cross car beam 1" means the area (total area) of respective contact regions of the upper segment 2a and the lower segment 2b with the front surface 1a of the cross car beam 1. Further, the area of "the rear surface 1b of the cross car beam 1" means the area (total area) of respective contact regions of the upper segment 2a and the lower segment 2b with the rear surface 1b of the cross car beam 1. In this specification, the term "surface contact" means not only a contact of two surfaces but also a contact thereof while interposing an adhesive layer therebetween.

From the viewpoint of a further improvement in the steering device vibration performance, the upper segment 2a and the lower segment 2b are preferably configured such that they come into surface contact with each other, and further each of them comes into surface contact with the cross car beam 1, as depicted in FIGS. 6B and 6C. From the viewpoint of a further reduction in weight and a further improvement in the collision performance and the steering device vibration performance, each of the upper segment 2a and the lower segment 2b preferably has the following steering device support member rib structure, as depicted in FIGS. 6A to 6D.

Specifically, the upper segment 2a and the lower segment 2b preferably have a plurality of portions (22a to 24a and 22b to 24b) corresponding ones of which come into contact with each other, and a plurality of portions (25a to 27a and 25b to 27b) each of which comes into contact with the cross car beam 1, wherein each of the portions is composed of a surface member. Further, each of the upper segment 2a and the lower segment 2b preferably has a steering device support member rib structure (see FIG. 6A, FIG. 6D) having an outer edge rib (201a, 201b) provided to extend from outer edges of the surface members in a direction perpendicular to the surface members, and an inner rib (202a, 203a, 202b, 203b) provided on an inner side of the outer edge rib to extend from the surface members in the direction perpendicular to the surface members.

The direction along which each of the outer edge rib and the inner rib extends (direction perpendicular to the surface members) is the floor-to-roof direction Hr in regard to the upper segment 2a, and the roof-to-floor direction Hr in regard to the lower segment 2b. In this specification, the term "surface member" means, unless otherwise specified, a planar member (planar-shaped member).

In the steering device support member rib structure, a plan-view shape of each of a plurality of spaces defined by the ribs may be a polygonal shape such as a tetragonal shape, a pentagonal shape or a hexagonal shape. Thus, this rib structure includes a honeycomb structure in which the plan-view shape of each of the plurality of spaces is a hexagonal shape. In this specification, the term "plan-view shape" of the rib structure means a shape when viewing the upper or lower segment from thereabove in a state in which the segment is set in a posture where the surface members are located on a bottom side there, and statically placed on a flat surface.

From the viewpoint of a further improvement in the collision performance and the steering device vibration performance, in each of the upper segment 2a and the lower segment 2b, the inner rib preferably includes at least a perpendicular rib (202a, 202b) on the surface members, and more preferably includes the perpendicular rib and a width-directional rib (203. 203b) on the surface members.

The perpendicular rib is a rib extending on the surface members in a direction perpendicular to the axial direction of the cross car beam 1. The width-directional rib is a rib extending on the surface members in a direction parallel to the axial direction of the cross car beam 1. The width-directional rib also has a function of preventing overturn of the perpendicular rib during production of the upper and lower segments. Although each of the perpendicular and width-directional ribs has even height in the axial direction of the cross car beam 1, as depicted in FIGS. 6A, 6B, etc., the rib structure is not limited thereto, but the width-directional rib may have a height lower than that of the perpendicular rib.

In each of the upper segment 2a and the lower segment 2b, each of the perpendicular rib and the width-directional rib may have a fastening opening and/or a fastening cutout for fastening between the steering device support member and the cross car beam, individually. In particular, the width-directional rib typically has a fastening opening (204a, 204b) and/or a fastening cutout (205b), as depicted in FIGS. 6A and 6D. In this specification, the term "fastening" is used as a concept of fixing two or more members together and encompassing fastening using an adhesive in combination.

The thickness of each of the surface members, the outer edge rib and the inner rib in the steering device support member 2 is not particularly limited, but may be appropriately determined depending on the intended use of the steering device support structure. In the case where the steering device support structure is used in a vehicle, particularly in an automobile, each of the thicknesses of the surface members, the outer edge rib and the inner rib is set to, e.g., the range of 0.5 to 10 mm, preferably, the range of 0.5 to 3 mm, individually.

From the viewpoint of a further improvement in the collision performance and the steering device vibration performance, the front end 21 of the steering device support member 2 is preferably composed of a front end 21a of the upper segment 2a and a front end 21b of the lower segment 2b. From the same viewpoint, one of the front ends 21a, 21b of the upper and lower segments 2a, 2b is preferably formed as a bent and extended portion 211 configured to cover the remaining one of the front ends 21a, 21b, and fixable to the cowl. The state in which a first one of the front ends covers the other, second, front end means that the first front end is disposed forward of the second front end, while being in contact with the second front end. From the same viewpoint, the first front end formed as the bent and extended portion 211 is preferably the front end 21a of the upper segment 2a, as depicted in FIGS. 6E, 6F and 6G. Alternatively, the first front end formed as the bent and extended portion 211 may be the front end 21b of the lower segment 2b. One (e.g., 2a in the figures) of the upper and lower segments having the first front end formed as the bent and extended portion 211 and the other segment (e.g., 2b in the figures) will hereinafter be referred to respectively as "the segment X" ad "the segment Y".

As depicted in FIGS. 6E, 6F and 6G, the first front end (e.g., 21a in the figures) formed as the bent and extended portion 211 preferably has a bulging part 2111 bulging rearwardly, and the second front end (e.g., 21b in the figures) preferably has a recessed part 2111 for fittingly covering lateral surfaces of the bulging part 2111. The bulging part 2111 is a part of the first front end in which the thickness thereof is locally increased, and typically formed in a vehicle width directional central region of the first front end. The recessed part 2111 is a so-called cutout whose size is determined so as to fittingly cover the lateral surfaces of the bulging part 2111 by lateral surfaces thereof.

In FIGS. 6F and 6G, each of the bulging part 2111 and the recessed part 2112 has a tetragonal shape. However, the shape of each of the bulging part 2111 and the recessed part 2112 is not particularly limited as long as it is a mutually complementary shape, but may be a circular shape or a semicircular shape. The bulging part 2111 and the recessed part 2112 are fitted together. As a result, a rear surface of the first front end (e.g., 21a in the figures) formed as the bent and extended portion 211, and a front surface of the second front end (e.g., 21b in the figures), are brought into surface contact with each other. This enables both of the upper segment 2a and the lower segment 2b to function further effectively. More specifically, it is possible to receive a force input from the cowl by not only the first front end (e.g., 21a in the figures) (which is formed as the bent and extended portion 211) but also the second front end (e.g., 21b in the figures). This makes it possible to achieve a further improvement in the collision performance. Accordingly, the mechanical strength (particularly rigidity) in a direction perpendicular to an input direction of a force from the cowl is improved, and thereby a further improvement in the steering device vibration performance is achieved.

A bulging height m1 of the bulging part 2111 in the bent and extended portion 211 of the segment X as one of the upper segment 2a and the lower segment 2b is typically equivalent to a thickness of the front end of the segment Y, as depicted in FIG. 6E. The bulging height m1 is not particularly limited, but may be appropriately determined depending on the intended use of the steering device support structure. In the case where the steering device support structure is used in a vehicle, particularly in an automobile, the bulging height m1 is, e.g., from 0.5 to 10 mm, preferably from 0.5 to 3 mm. The thickness m2 of a non-bulging part in the front end of the segment X is not particularly limited, but may be appropriately determined depending on the intended use of the steering device support structure. In the case where the steering device support structure is used in a vehicle, particularly in an automobile, the thickness m2 is, e.g., from 1 to 10 mm, preferably from 1 to 5 mm.

Connection between the upper segment 2a and the lower segment 2b may be performed at any timing before or after clamping the cross car beam 1 by the upper segment 2a and the lower segment 2b. This connection may be achieved by fastening. In this specification, the fastening may be achieved by one or more fasteners selected from the group consisting of a rivet, a bolt, a screw, a pin, a staple, a strap, a stitch and any other fastener. Specifically, the fastener is preferably a rivet, a bolt or a screw, more preferably a rivet and a bolt. In the case where the connection between the upper segment 2a and the lower segment 2b is achieved by fastening using a bolt, this fastening is typically achieved by two-component co-fastening for the upper segment 2a and the lower segment 2b.

Preferably, in the segment Y (e.g., 2b in the figures) as one of the upper segment 2a and the lower segment 2b, the front end thereof has a perpendicular rib (e.g., 2020b in the figures) supporting a rear surface of the bulging part 2111 of the bent and extended portion 211. This perpendicular rib is a part of the aforementioned perpendicular rib (202a, 202b), i.e., a rib extending in a direction perpendicular to the axial direction of the cross car beam 1. This makes it possible to further effectively receive a force input from the cowl by both of the upper segment 2a and the lower segment 2b. The perpendicular rib (e.g., 2020b in the figures) may have a bolt-installing cutout 2021b.

Fixing of the front end 21 of the steering device support member 2 with respect to the cowl may be achieved by any of the aforementioned fasteners, preferably by a bolt or a rivet, more preferably by an adjusting bolt and/or an adjusting nut. The bent and extended portion 211 is typically formed with a fastening hole 2114 for fixing between the steering device support member 2 and the cowl. Through insert molding, a nut may be provided in coaxial relation to the fastening hole 2114. A front surface of the bent and extended portion 211 may be formed with a nut-receiving part 2113 having a hexagonal-shaped rib. In this case, a bolt is disposed to extend toward the cowl.

The steering device support member 2 is formed with a plurality of fastening holes. These fastening holes are formed at appropriate positions so as to achieve fastening between the upper segment and lower segment, fastening between the steering device support member 2 and at least one of the cross car beam 1 and the reinforcing member 5, and fastening between the steering device support member 2 and the cowl. In particular, the fastening between the steering device support member 2 and the cross car beam 1 is typically achieved by two-component co-fastening for them.

The upper segment 2a and the lower segment 2b forming the steering device support member 2 are typically fastened together in front sections thereof positioned forward of the installation position of the cross car beam 1, and rear sections thereof positioned rearward of the installation position of the cross car beam 1. Preferably, fastening of the steering device support member 2 with respect to the reinforcing member 5 (aftermentioned side bracket-side reinforcing member 5a and/or aftermentioned center stay-side reinforcing member 5b) is achieved at a position between a mutually-fastened area of the front sections and a mutually-fastened area of the rear sections in the forward-rearward direction (F-R direction). In this case, the steering device support structure 10 becomes much less likely to undergo torsional deformation and thus vibration becomes much less likely to be transmitted, so that the steering device vibration performance is further sufficiently improved.

The upper segment 2a and the lower segment 2b forming the steering device support member 2 are typically fastened together in front sections thereof positioned forward of the installation position of the cross car beam 1, and rear sections thereof positioned rearward of the installation position of the cross car beam 1. Preferably, fastening of the steering device support member 2 with respect to the reinforcing member 5 (aftermentioned side bracket-side reinforcing member 5*a* and/or aftermentioned center stay-side reinforcing member 5*b*) is achieved at a position between a mutually-fastened area K of the front sections and a mutually-fastened area L of the rear sections in the forward-rearward direction (F-R direction), as depicted in FIG. 2D. In this case, the steering device support structure 10 becomes much less likely to undergo torsional deformation and thus vibration becomes much less likely to be transmitted, so that the steering device vibration performance is further sufficiently improved.

Preferably, the steering device support member 2 at least partly has a shape tapered in a direction from a rear end 29 toward the front end 21, i.e., a shape whose width along the vehicle width direction W gradually decreases in the direction from the rear end 29 toward the front end 21, as depicted in FIGS. 2A to 2D. More specifically, the steering device support member 2 has a shape whose width along the vehicle width direction W is approximately constant in a range from the rear end 29 to the vicinity of the front end 21, and then continuously and gradually decreases in the front end 21 toward a forward edge of the front end 21. The vicinity of the front end 21 means a region away from the forward edge of the front fend 21 by a distance of about 0.1×L to about 0.5×L, particularly a region away from the forward edge of the front fend 21 by a distance of about 0.2×L to about 0.4×L, where L denotes the overall length (mm) of the steering device support member 2.

The rear end 29 of the steering device support member 2 means one end of the steering device support member 2 on a rearwardmost side in the vehicle rearward direction R. In this specification, the taper shape of the steering device support member is a shape when viewed downwardly from the side of the roof in the vehicle height direction.

A material for the steering device support member 2 is not particularly limited. For example, the material may be a metal such as aluminum, iron, steel or an alloy thereof, or may be a resin such as a polymer, or a fiber-reinforced resin. From the viewpoint of a further reduction in weight, and a further improvement in the collision performance and the steering device vibration performance, the material for the steering device support member 2 is preferably a polymer material. The polymer material for the steering device support member 2 is not particularly limited. Examples of the polymer material may include a polyamide-based resin, a polyacrylic-based resin, a polyester-based resin, a polycarbonate-based resin, a polyolefin-based resin, a polyphenylene sulfide-based resin, RRP (fiber-reinforced plastic), and FRTP (fiber-reinforced thermo-plastic). Preferably, the polymer material is FRTP. In the case where the steering device support member 2 is formed of the polymer material, it can be produced by, e.g., injection molding.

(Center Stay)

The center stay 3 is a member having a function of supporting the cross car beam 1 in its center portion, from the bottom of the vehicle (in this embodiment, a floor panel of the automobile) (not depicted). The central portion means a portion of the cross car beam 1 extending between opposite ends thereof, and typically a portion of the cross car beam 1 extending between the driver seat and the front passenger seat in the axial direction of the cross car beam 1. The center stay 3 typically comprises an angular C-shaped fixing section 30 fixed to the cross car beam 1 so as to cover a portion of the cross car beam 1, and a stay body 300 supporting the fixed portion 30.

Although one example of the center stay 3 will be shown below, it is apparent that the center stay 3 is not limited to the following example as long as it has the aforementioned function.

The fixing section 30 of the center stay 3 is typically composed of a surface member surrounding at least the planar portion of the cross car beam 1. Preferably, the fixing section 30 is composed of three surface members formed in an angular C shape to surround three of the four surfaces of the cross car beam 1, particularly the rear surface, the top surface and the bottom surface (1*b*, 1*c* and 1*d* in FIG. 5A) of the cross car beam 1. As depicted in FIGS. 5A, 7A, 7B and 7C, the fixing section 30 covers (surrounds) each of the top surface 1*c* and the bottom surface 1*d* over the overall length thereof in a vehicle longitudinal direction. The fixing section 30 needs not necessarily be formed to cover each of the top surface 1*c* and the bottom surface 1*d* over the overall length thereof in the vehicle longitudinal direction. For example, the fixing section 30 may be formed to cover at least respective parts of the top surface 1*c* and the bottom surface 1*d*, individually. From the viewpoint of a further improvement in the collision performance and the steering device vibration performance, the fixing section 30 preferably covers each of the top surface 1*c* and the bottom surface 1*d* over the overall length thereof in the vehicle longitudinal direction. In the above description, the term "vehicle longitudinal direction" means the forward-rearward direction (F-R direction) of the vehicle. The fixing section 30 is typically fixed such that an inner surface thereof comes into surface contact with the cross car beam. This makes it possible to achieve a further improvement in the collision performance and the steering device vibration performance.

The overall thickness Cd (FIG. 9) of the center stay 3 at one end thereof having the fixing section 30 is typically equal to or greater than 0.2×D, preferably from 0.2×D to 3×D, more preferably from 0.4×D to 2.5×D, where D denotes the width (mm) of the rear surface 1*b* of the cross car beam 1.

The stay body 300 of the center stay 3 may have a solid plate-like structure. However, from the viewpoint of a further reduction in weight and a further improvement in the collision performance and the steering device vibration performance, the stay body 300 preferably has the following center stay rib structure, as depicted in FIGS. 7A, 7B and 7C.

Specifically, the stay body 300 preferably has a center stay rib structure which comprises: a surface member 31; an outer edge rib 301 provided to extend from an outer edge of the surface member in a direction perpendicular to the surface member; and an inner rib 302 provided on an inner side of the outer edge rib to extend from the surface member in the direction perpendicular to the surface member.

In the center stay rib structure, a plan-view shape of each of a plurality of spaces defined by the ribs may be a polygonal shape such as a tetragonal shape, a pentagonal shape or a hexagonal shape. Thus, this rib structure includes a honeycomb structure in which the plan-view shape of each of the plurality of spaces is a hexagonal shape.

From the viewpoint of a further improvement in the collision performance and the steering device vibration performance, the inner rib 302 preferably includes a plurality of ribs extending on the surface member 31 in two mutually-orthogonal directions. From the same view point, the inner rib preferably includes a perpendicular rib (302*a*) and a width-directional rib (302*b*). The perpendicular rib is a rib extending on the surface member 31 in a roof-floor direction (Hr-Hf direction). The width-directional rib is a rib extending on the surface member 31 in a direction perpendicular to the roof-floor direction (Hr-Hf direction). Although each of the perpendicular and width-directional ribs typically has even height, as depicted in FIGS. 7A, 7B and 7C, the rib structure is not limited thereto, but the width-directional rib may have a height lower than that of the perpendicular rib.

Each of the rib heights of the outer edge rib and the inner rib of the center stay 3 is typically set to 0.1×D or more, preferably the range of 0.1×D to 1×D, more preferably the range of 0.2×D to 0.5×D, individually, where D denotes the width (mm) of the rear surface 1b of the cross car beam 1.

In the center stay 3, the thickness of each of the surface member, the outer edge rib and the inner rib is not particularly limited, but may be appropriately determined depending on the intended use of the steering device support structure. In the case where the steering device support structure is used in a vehicle, particularly in an automobile, each of the thicknesses of the surface member, the outer edge rib and the inner rib of the center stay 3 is set to, e.g., the range of 0.5 to 10 mm, preferably the range of 0.5 to 3 mm, individually.

Although each of the outer edge rib and the inner rib of the center stay 3 is provided to extend from the surface member 31 positioned at the driver seat side, toward the front passenger seat side, as depicted in FIG. 1A, etc., the rib structure is not limited thereto, but each of the outer edge rib and the inner rib of the center stay 3 may be provided to extend from the surface member positioned at the front passenger seat side, toward the driver seat side. From the viewpoint of a further improvement in the collision performance and the steering device vibration performance, each of the outer edge rib and the inner rib of the center stay 3 is preferably provided to extend from the surface member 31 positioned at the driver seat side, toward the front passenger seat side.

Typically, fastening between the center stay 3 and the cross car beam 1 is achieved by two-component co-fastening for these two components, and/or three-component co-fastening for the two components and the reinforcing member 5 which will be described in detail later. The center stay 3 may have a fastening extension piece 32 formed with a fastening hole (C1, C2), as depicted to FIGS. 7A and 9, to achieve the fastening between the center stay 3 and the cross car beam 1 through the use of the fastening extension piece 32 with the fastening hole (C1, C2).

The center stay 3 is formed with a plurality of fastening holes. These fastening holes are formed at appropriate positions so as to achieve fastening between the center stay 3 and at least one of the cross car beam 1 and the reinforcing member 5.

For example, as depicted in FIGS. 7B, 7C, 8 and 9, the center stay 3 may have a fastening hole R1 formed in the surface member 31 at a position between aftermentioned protrusions 35, to achieve fastening between the aftermentioned center stay-side reinforcing member 5b and the center stay 3 through the use of the fastening hole R1, by means of two-component co-fastening (2B') for the aftermentioned center stay-side reinforcing member 5b and the center stay 3.

From the viewpoint of a further improvement in the steering device vibration performance, in the center stay 3, the fixing section 30 preferably has a protrusion 35 protruding therefrom in the vehicle rearward direction (R direction) and extending therealong in the axial direction of the cross car beam 1 (i.e., the vehicle width direction (W direction), particularly, the front passenger seat-to-driver seat direction (Wd direction)), as depicted in FIGS. 7A to 7C, 8 and 9. The protrusion 35 is a rib or a pleat provided between the fixing section 30 and the stay body 300.

The protrusion 35 has two principal surfaces (side surfaces) and one or more edge faces. The principal surface (side surface) means a surface perpendicular to a thickness direction of the protrusion 35. On the other hand, the edge face means a surface parallel to the thickness direction of the protrusion 35. The protrusion 35 is configured to be fittingly engaged with a concaved-shaped wall portion 55 of the aftermentioned center stay-side reinforcing member 5b. This configuration makes it possible to reduce displacement due to flexural stress converted based on the reinforcing member 5, and thereby further sufficiently reduce vibration to be transmitted. Thus, based on the above fitting engagement, vibration transmission to a passenger is further sufficiently prevented, and thereby the steering device vibration performance is further sufficiently improved. Therefore, in addition to an effect of improving the steering device vibration performance based on "conversion of torsional stress to flexural stress by the reinforcing member", it becomes possible to obtain an effect of improving the steering device vibration performance based on "reduction in flexural deformation-caused displacement by means of fitting engagement between the center stay and the reinforcing member".

The number of the protrusions 35 is not particularly limited. In the case where the steering device support structure is used in an automobile, the number per the aftermentioned center stay-side reinforcing member 5b is one or more, preferable from two to six, more preferably three to five. In a case where the number of the protrusions 35 is two or more, adjacent two of the protrusions 35 may be coupled together by the perpendicular rib.

An R-directional length hp (FIG. 7B) of the protrusion 35 is not particularly limited, but typically from 0.1×D to 1×D, where D denotes the width (mm) of the rear surface 1b of the cross car beam 1. Further, from the viewpoint of a balance between a further reduction in weight and a further improvement in the steering device vibration performance, the R-directional length hp is preferably from 0.2×D to 0.6×D, more preferably from 0.3×D to 0.5×D.

A W-directional length Cp (FIG. 9) of the protrusion 35 is not particularly limited, but typically from 0.1×D to 1×D, where D denotes the width (mm) of the rear surface 1b of the cross car beam 1. Further, from the viewpoint of the balance between a further reduction in weight and a further improvement in the steering device vibration performance, the W-directional length Cp is preferably from 0.2×D to 0.5×D, more preferably from 0.2×D to 0.4×D.

The thickness of the protrusion 35 is not particularly limited, but may be appropriately determined depending on the intended use of the steering device support structure. In the case where the steering device support structure is used in a vehicle, particularly in an automobile, the thickness of the protrusion 35 is typically from 0.5 to 5 mm. Further, from the viewpoint of the balance between a further reduction in weight and a further improvement in the steering device vibration performance, the thickness of the protrusion 35 is preferably from 1 to 4 mm.

A material for the center stay 3 is not particularly limited. Examples of the material may include the same materials as those for the steering device support member 2. From the viewpoint of a further reduction in weight, and a further improvement in the collision performance and the steering device vibration performance, the material for the center stay 3 is preferably a polymer material. The polymer material for the center stay 3 is not particularly limited. Examples of the polymer material may include the same polymer materials as those for the steering device support member 2. Preferably, the polymer material is FRTP. In the case where the center stay 3 is formed of the polymer material, it can be produced by, e.g., injection molding.

(Side Brackets)

The side brackets 4 are fixing members for fixing the cross car beam 1 to the body of the vehicle (vehicle body) while supporting the cross car beam 1 at opposite ends thereof. As depicted in FIGS. 2A, 2B, 2C and 2D, each of the side brackets 4 comprises an attaching portion 41 formed to surround an outer periphery of a corresponding one of the opposite ends of the cross car beam 4 so as to achieve fastening between the cross car beam 1 and the side bracket 4, and a flange portion 42 for fixing the side bracket 4 to the vehicle body.

Typically, fastening between the side bracket 4 and the cross car beam 1 is achieved by two-component co-fastening for these two components, and/or three-component co-fastening for the two components and the reinforcing member 5 which will be described in detail later. The side bracket 4 may have a fastening extension piece to achieve the fastening between the side bracket 4 and the cross car beam 1 through the use of the fastening extension piece.

The side bracket 4 is formed with a plurality of fastening holes. These fastening holes are formed at appropriate positions so as to achieve fastening between the side bracket and at least one of the cross car beam 1 and the reinforcing member 5.

A material for the side bracket 4 is not particularly limited. Examples of the material may include the same materials as those for the steering device support member 2. From the viewpoint of a further reduction in weight, and a further improvement in the collision performance and the steering device vibration performance, the material for the side bracket 4 is preferably a polymer material. The polymer material for the side bracket 4 is not particularly limited. Examples of the polymer material may include the same polymer materials as those for the steering device support member 2. Preferably, the polymer material is FRTP. In the case where the side bracket 4 is formed of the polymer material, it can be produced by, e.g., injection molding.

(Reinforcing Member)

The reinforcing member 5 is a member which is fastened to the steering device support member 2 while covering the planar portion of the cross car beam 1, and has a function of changing a deformation mode during deformation of the cross car beam 1 due to a force input to the steering device support structure 10. Specifically, the reinforcing member 5 is a deformation mode conversion member for changing a mode of deformation of the cross car beam due to a force input to the steering device support structure 10, from a "torsional deformation mode" to a "flexural deformation mode, to thereby sufficiently convert torsional stress input to the steering device support structure 10, to flexural stress. This makes it possible to sufficiently prevent a vibration input to the steering device support structure 10, such as a traveling vibration during traveling and an engine vibration during engine running, from being transmitted to a passenger, to thereby sufficiently improve the steering device vibration performance, as mentioned above. If the reinforcing member 5 is not fastened to the steering device support member 2, it is impossible to convert the torsional stress input to the steering device support structure 10, to flexural stress. Thus, the vibration is transmitted inside the vehicle, without being sufficiently reduced, resulting in giving a passenger a discomfort feeling.

The location of the planner portion of the cross car beam 1 to be covered by the reinforcing member 5 is not particularly limited, as mentioned above. For example, in the case where the cross car beam 1 has a rectangular cross-sectional shape, the location may be one or more surfaces selected from the group consisting of the front surface 1*a*, the rear surface 1*b*, the top surface 1*c* and the bottom surface 1*d* as depicted in FIG. 5A. Particularly, as depicted in FIG. 1, etc., the location of the planner portion of the cross car beam 1 to be covered by the reinforcing member 5 is preferably at least the rear surface 1*b* of the cross car beam 1, from the viewpoint of a further improvement in the steering device vibration performance, and more preferably only the rear surface 1*b*, from the above viewpoint and the viewpoint of a further reduction in weight.

Although the reinforcing member 5 is configured to cover a part of the planer portion of the cross car beam 1 located on the side of the steering device support member 2 (located offset in the front passenger seat-to-driver seat direction Wd) with respect to the center stay 3, as depicted in FIG. 1, etc., the configuration is not limited thereto. For example, in place of or in addition to the part of the planer portion, the reinforcing member 5 may be configured to cover a part of the planer portion located offset in the driver seat-to-front passenger seat direction Wp with respect to the center stay 3. The reinforcing member 5 is preferably configured to cover at least a part of the planer portion located offset in the front passenger seat-to-driver seat direction Wd with respect to the center stay 3, from the viewpoint of a further improvement in the steering device vibration performance, and more preferably configured to cover only the part of the planer portion located offset in the front passenger seat-to-driver seat direction Wd with respect to the center stay 3, from the above viewpoint and the viewpoint of a further reduction in weight.

The reinforcing member 5 may have a solid plate-like structure. However, from the viewpoint of a further reduction in weight and a further improvement in the collision performance and the steering device vibration performance, the reinforcing member 5 preferably has the following reinforcing member rib structure, as depicted in FIGS. 2A, 2B, 2C, 2D, 3 and 10A.

Specifically, the reinforcing member rib structure comprises a surface member 50; an outer edge rib 501 standingly provided on and along an outer edge of the surface member; and an inner rib 502 provided on the surface member in a region on an inner side of the outer edge rib.

In this connection, the reinforcing member 5 needs not necessarily have the surface member 50. However, from the viewpoint of a further improvement in the steering device vibration performance, the reinforcing member 5 preferably has the surface member 50.

In the reinforcing member rib structure, a plan-view shape of each of a plurality of spaces defined by the ribs may be a polygonal shape such as a tetragonal shape, a pentagonal shape or a hexagonal shape. Thus, this rib structure includes a honeycomb structure in which the plan-view shape of each of the plurality of spaces is a hexagonal shape.

The inner rib 502 includes at least a perpendicular rib (502*a*). Particularly, from the viewpoint of a further improvement in the collision performance and the steering device vibration performance, the inner rib 502 preferably includes the perpendicular rib (502*a*) and a width-directional rib (502*b*).

The perpendicular rib (502*a*) is a rib extending on the surface member 50 in a direction perpendicular to the axial direction of the cross car beam 1. By the perpendicular rib, resistance to flexural stress converted from torsional stress is imparted to the steering device support structure 10. Particularly, in the case where the steering device support structure 10 has the reinforcing member 5 on the planner portion formed in the rear surface of the cross car beam, the perpendicular rib can reduce a displacement to be caused by the flexural stress in a upward-rearward direction (the roof-floor direction (Hr-Hf direction)) and a longitudinal direction (the forward-rearward direction (F-R direction)). Thus, by providing the perpendicular rib, the steering device vibration performance is significantly improved. Further, for example, compared with the case where the reinforcing member 5 has a solid plate-like structure, significantly excellent steering device vibration performance can be obtained.

The width-directional rib (502*b*) is a rib extending on the surface member 50 along a direction parallel to the axial direction of the cross car beam 1. By the width-directional rib, the resistance to flexural stress converted from torsional stress is also imparted to the steering device support structure 10. Particularly, in the case where the steering device support structure 10 has the reinforcing member 5 on the planner portion formed in the rear surface of the cross car beam, the width-directional rib can reduce a displacement to be caused by the flexural stress in the longitudinal direction (the forward-rearward direction (F-R direction)). Thus, by providing the width-directional rib, the steering device vibration performance is significantly improved.

Although each of the perpendicular and width-directional ribs typically has even height, as depicted in FIGS. 2A, 2B, 2C, 2D and 3, the rib structure is not limited thereto, but the width-directional rib may have a height lower than that of the perpendicular rib.

Each of the rib heights hl (FIG. 10A) of the outer edge rib and the inner rib of the reinforcing member 5 is typically set to 0.1×D or more, preferably the range of 0.1×D to 1×D, more preferably the range of 0.2×D to 0.5×D, individually, where D denotes the width (mm) of the rear surface 1*b* of the cross car beam 1.

In the reinforcing member 5, the thickness of each of the surface member, the outer edge rib and the inner rib is not particularly limited, but may be appropriately determined depending on the intended use of the steering device support structure. In the case where the steering device support structure is used in a vehicle, particularly in an automobile, each of the thicknesses of the surface member, the outer edge rib and the inner rib of the reinforcing member 5 is set to, e.g., the range of 0.5 to 10 mm, preferably the range of 0.5 to 3 mm, individually.

In the case where the reinforcing member 5 has the reinforcing member rib structure, the reinforcing member 5 is typically disposed such that the surface member 50 (particularly, a reverse surface thereof) comes into surface contact with the planar portion of the cross car beam 1.

The reinforcing member 5 may be fastened to at least the steering device support member 2. Preferably, from the viewpoint of a further improvement in the steering device vibration performance, the reinforcing member 5 is fastened to the steering device support member 2, and at least one of the side bracket 4 and the center stay 3. By fastening the reinforcing member 5 to the side bracket 4 and the steering device support member 2, it becomes possible to achieve coupling between the side bracket 4 and the steering device support member 2. On the other hand, by fastening the reinforcing member 5 to the center stay 3 and the steering device support member 2, it becomes possible to achieve coupling between the center stay 3 and the steering device support member 2.

The coupling between the side bracket 4 and the steering device support member 2 by the reinforcing member, and/or the coupling between the center stay 3 and the steering device support member 2 by the reinforcing member make it possible to achieve sufficient conversion from torsional stress to flexural stress. Thus, the steering device support structure 10 becomes much less likely to undergo deformation, and the steering device vibration performance is further sufficiently improved. In this specification, the term "coupling" is used as a concept of connecting and interlocking two or more members.

More preferably, from the viewpoint of a further improvement in the steering device vibration performance, the reinforcing member 5 is fastened to the cross car beam 1, the steering device support member 2, and at least one of the side bracket 4 and the center stay 3. Further preferably, from the same viewpoint, the reinforcing member 5 is fastened to the side bracket 4, the center stay 3, the cross car beam 1, and the steering device support member 2.

The reinforcing member 5 may have an extension portion extending from the top surface to the bottom surface of the cross car beam 1 so as to form an angular C-shaped surrounding portion, as will be described in detail later in connection with the aftermentioned center stay-side reinforcing member 5*b*. As described in connection with the aftermentioned center stay-side reinforcing member 5*b* with reference to FIG. 10B, the reinforcing member 5 (5*b*) has an extension portion 57 extending from the top surface to the bottom surface of the cross car beam 1 so as to form an angular C-shaped surrounding portion on the side of a reverse surface of the reinforcing member 5. That is, the reinforcing member 5 (5*b*) has an angular C-shaped cross-sectional shape. This cross-sectional shape means a shape of a cross-section taken along a plane perpendicular to the axial direction of the cross car beam 1. The angular C-shaped surrounding portion is typically configured such that an inner surface thereof comes into surface contact with the cross car beam 1. This makes it possible to further sufficiently prevent torsional deformation of the steering device support structure to further sufficiently improve the steering device vibration performance.

The reinforcing member 5 may include one or more reinforcing members. For example, as depicted in FIG. 1, etc., the reinforcing member 5 includes a side bracket-side reinforcing member 5*a* and a center stay-side reinforcing member 5*b*. However, from the viewpoint of a further improvement in the steering device vibration performance, the reinforcing member 5 may include at least one of the side bracket-side reinforcing member 5*a* and the center stay-side reinforcing member 5*b*.

As depicted in FIG. 1, the side bracket 4 and the steering device support member 2 are provided on the cross car beam 1 in spaced-apart relation to each other. The side bracket-side reinforcing member 5*a* is a reinforcing member 5 covering a part of the planar portion of the cross car beam 1 located between the side bracket 4 and the steering device support member 2.

As depicted in FIG. 1, the center stay 3 and the steering device support member 2 are provided on the cross car beam 1 in spaced-apart relation to each other. The center stay-side reinforcing member 5*b* is a reinforcing member 5 covering a part of the planar portion of the cross car beam 1 located between the center stay 3 and the steering device support member 2.

From the viewpoint of a further improvement in the steering device vibration performance, the reinforcing member 5 preferably includes at least the side bracket-side reinforcing member 5a, and more preferably includes both of the side bracket-side reinforcing member 5a and the center stay-side reinforcing member 5b.

The side bracket-side reinforcing member 5a is fastened to at least the steering device support member 2. Further, from the viewpoint of a further improvement in the steering device vibration performance, the side bracket-side reinforcing member 5a is fastened to at least the side bracket and the steering device support member, and more preferably fastened to the side bracket, the cross car beam and the steering device support member.

The side bracket-side reinforcing member 5a may be formed with a plurality of fastening holes, wherein the side bracket-side reinforcing member 5a and other member may be fastened together via the plurality of fastening holes.

As depicted in FIGS. 2A and 2D, the side bracket-side reinforcing member 5a may have a fastening peripheral piece 51a formed on the side of the steering device support member 2 along an obverse surface of the steering device support member 2, wherein the fastening peripheral piece 51a may be formed with two fastening holes P1, P2.

As will be described in detail in connection with the center stay-side reinforcing member 5b, the side bracket-side reinforcing member 5a may have an extension portion extending from the top surface to the bottom surface of the cross car beam 1 so as to form an angular C-shaped surrounding portion. As will be described with reference to FIG. 10B in connection with the center stay-side reinforcing member 5b which will be described in detail later, the reinforcing member 5(5b) may have an extension portion 57 extending from the top surface to the bottom surface of the cross car beam 1 so as to form an angular C-shaped surrounding portion on the side of a reverse surface thereof. That is, the side bracket-side reinforcing member 5a has an angular C-shaped cross-sectional shape. This cross-sectional shape means a shape of a cross-section taken along a plane perpendicular to the axial direction of the cross car beam 1. The angular C-shaped surrounding portion is typically configured such that an inner surface thereof comes into surface contact with the cross car beam 1. This makes it possible to further sufficiently prevent torsional deformation of the steering device support structure to further sufficiently improve the steering device vibration performance.

From the viewpoint of a further improvement in the steering device vibration performance, the side bracket-side reinforcing member 5a may have a plurality of fastening peripheral pieces 52a, 53a on the extension portion, wherein the fastening peripheral pieces 52a, 53a may be formed, respectively, with a plurality of fastening holes M1 to M4, as depicted in FIGS. 2A to 2D. The fastening holes M1 to M4 can be used for fastening between the side bracket-side reinforcing member 5a and other member.

In the side bracket-side reinforcing member 5a, the surface member 50 may be formed with a plurality of fastening holes P3 to P8, as depicted in FIGS. 2A and 2D. The fastening holes P3 to P8 can be used for fastening between the side bracket-side reinforcing member 5a and other member.

In the side bracket-side reinforcing member 5a, the fastening holes P1 to P8, M1 to M4 are formed at appropriate positions so as to achieve fastening with other member. It should be noted that the number of fastening points between the side bracket-side reinforcing member 5a and other member is one or more. Preferably, the number may be increased to two or more, depending on the size of the side bracket-side reinforcing member 5a.

For example, as depicted in FIGS. 2A and 2D, fastening between the side bracket-side reinforcing member 5a and the steering device support member 2 is achieved by two component co-fastening (1A) for the side bracket-side reinforcing member 5a and the steering device support member 2, using the fastening holes P1, P2. More specifically, the fastening holes P1, P2 can be used, respectively, for fastening between the fastening peripheral piece 51a and the upper segment 2a of the steering device support member 2, and fastening between the fastening peripheral piece 51a and the lower segment 2b of the steering device support member 2, to thereby achieve the two component co-fastening (1A) for the side bracket-side reinforcing member and the steering device support member. The number of fastening points between the side bracket-side reinforcing member 5a and the steering device support member 2 is typically one or more, preferably two or more. Particularly, in the case where the steering device support structure is used in an automobile, the number is preferably from two to four.

On the other hand, for example, as depicted in FIGS. 2A, 2C, 2D and 3, fastening between the side bracket-side reinforcing member 5a and the side bracket 4 is achieved by three-component co-fastening (1B) for the side bracket-side reinforcing member 5a, the side bracket 4 and the cross car beam 1, using the fastening holes M1, M2, P3, P4. The three-component co-fastening (1B) is achieved in an overlapping area among a side bracket-side end (fastening holes P3, P4) of the surface member 50 and the fastening peripheral pieces 52a, 53a (fastening holes M1, M2) on the extension portion 57 in the side bracket-side reinforcing member 5a; the attaching portion 41 (fastening holes formed in the attaching portion 41) of the side bracket 4; and the cross car beam 1. The number of fastening points between the side bracket-side reinforcing member 5a and the side bracket 4 is typically one or more, preferably two or more. Particularly, in the case where the steering device support structure is used in an automobile, the number is preferably from four to six.

On the other hand, for example, as depicted in FIGS. 2A and 3, fastening between the side bracket-side reinforcing member 5a and the cross car beam 1 is achieved, using the fastening holes M1 to M4, P3 to P8, by three-component co-fastening (1B) for the side bracket-side reinforcing member 5a, the side bracket 4 and the cross car beam 1 (using the fastening holes M1, M2, P3, P4), and two-component co-fastening (1C) for the side bracket-side reinforcing member 5a and the cross car beam 1 (using the fastening holes M3, M4, P5 to P8). The number of fastening points between the side bracket-side reinforcing member 5a and the cross car beam 1 is typically one or more, preferably two or more. Particularly, in the case where the steering device support structure is used in an automobile, the number is preferably from six to twelve.

The fastening between the side bracket-side reinforcing member 5a and the cross car beam 1 needs not necessarily be achieved by the combination of the three-component co-fastening (1B) and the two-component co-fastening (1C), but may be achieved by at least one of the two types of co-fastenings. From the viewpoint of a further improvement in the steering device vibration performance, the fastening between the side bracket-side reinforcing member 5a and the cross car beam 1 is preferably achieved by the combination of the three-component co-fastening (1B) and the two-component co-fastening (1C).

The center stay-side reinforcing member 5b is fastened to at least the steering device support member 2. Further, from the viewpoint of a further improvement in the steering device vibration performance, the center stay-side reinforcing member 5b is fastened to at least the center stay and the steering device support member, and more preferably fastened to the center stay, the cross car beam and the steering device support member.

The center stay-side reinforcing member 5b may be formed with a plurality of fastening holes, wherein the center stay-side reinforcing member 5b and other member may be fastened together via the plurality of fastening holes.

As depicted in FIGS. 2B, 10A and 10B, the center stay-side reinforcing member 5b may have a fastening peripheral piece 51b formed on the side of the steering device support member 2 along the obverse surface of the steering device support member 2, wherein the fastening peripheral piece 51b may be formed with two fastening holes Q1, Q2.

As depicted in FIG. 10B, the center stay-side reinforcing member 5b may have an extension portion 57 extending from the top surface to the bottom surface of the cross car beam 1 so as to form an angular C-shaped surrounding portion on the side of a reverse surface thereof. This angular C-shaped surrounding portion is configured to cover not only the planar portion corresponding to the rear surface of the cross car beam 1 but also a part of the top surface and a part of the bottom surface of the cross car beam 1. The angular C-shaped surrounding portion is typically configured such that an inner surface thereof comes into surface contact with the cross car beam 1. This makes it possible to further sufficiently prevent torsional deformation of the steering device support structure to further sufficiently improve the steering device vibration performance.

From the viewpoint of a further improvement in the steering device vibration performance, the center stay-side reinforcing member 5b may have a plurality of fastening peripheral pieces 52b, 53b on the extension portion, wherein the fastening peripheral pieces 52b, 53b may be formed, respectively, with a plurality of fastening holes N1 to N4, as depicted in FIGS. 2A to 2D. The fastening holes N1 to N4 can be used for fastening between the center stay-side reinforcing member 5b and other member.

As depicted in FIGS. 2D and 10A, the center stay-side reinforcing member 5b may have a fastening peripheral piece 54b formed on the side of the center stay 3 along an obverse surface of the center stay 3, wherein the fastening peripheral piece 54b may be formed with a fastening hole Q7.

In the center stay-side reinforcing member 5b, the surface member 50 may be formed with a plurality of fastening holes Q3 to Q6, as depicted in FIG. 10B. The fastening holes Q3 to Q6 can be used for fastening between the center stay-side reinforcing member 5b and other member.

In the center stay-side reinforcing member 5b, the fastening holes Q1 to Q6, N1 to N4 are formed at appropriate positions so as to achieve fastening with other member. It should be noted that the number of fastening points between the center stay-side reinforcing member 5b and other member is one or more. Preferably, the number may be increased to two or more, depending on the size of the center stay-side reinforcing member 5b.

For example, as depicted in FIGS. 2B, 10A and 10B, fastening between the center stay-side reinforcing member 5b and the steering device support member 2 is achieved by two component co-fastening (2A) for the center stay-side reinforcing member 5b and the steering device support member 2, using the fastening holes Q1, Q2. More specifically, the fastening holes Q1, Q2 can be used, respectively, for fastening between the fastening peripheral piece 51b and the upper segment 2a of the steering device support member 2, and fastening between the fastening peripheral piece 51b and the lower segment 2b of the steering device support member 2, to thereby achieve the two component co-fastening (2A) for the center stay-side reinforcing member and the steering device support member. The number of fastening points between the center stay-side reinforcing member 5b and the steering device support member 2 is typically one or more, preferably two or more. Particularly, in the case where the steering device support structure is used in an automobile, the number is preferably from two to four.

On the other hand, for example, as depicted in FIGS. 2A, 2C, 2D, 3, 10A and 10B, fastening between the center stay-side reinforcing member 5b and the center stay 3 achieved, using the fastening holes N1, N2, Q5, Q6, Q7, by three-component co-fastening (2B) for the center stay-side reinforcing member 5b, the center stay 3 and the cross car beam 1 (using the fastening holes N1, N2, Q5, Q6), and two-component co-fastening (2B') for the center stay-side reinforcing member 5b and the center stay 3 (using the fastening hole Q7).

The three-component co-fastening (2B) is achieved in an overlapping area among a center stay-side end (fastening holes Q5, Q6) of the surface member 50 of the center stay-side reinforcing member 5b; the fixing section 30 (fastening holes formed in the fixing section) of the center stay 3; and the cross car beam 1. The number of fastening points between the center stay-side reinforcing member 5b and the center stay 3 is typically one or more, preferably two or more. Particularly, in the case where the steering device support structure is used in an automobile, the number is preferably from four to six.

The fastening between the center stay-side reinforcing member 5b and the center stay 3 needs not necessarily be achieved by the combination of the three-component co-fastening (2B) and the two-component co-fastening (2B'), but may be achieved by at least one of the two types of co-fastenings. From the viewpoint of a further improvement in the steering device vibration performance, the fastening between the center stay-side reinforcing member 5b and the center stay 3 is preferably achieved by the combination of the three-component co-fastening (2B) and the two-component co-fastening (2B').

On the other hand, for example, as depicted in FIGS. 2A, 2C, 2D, 3, 10A and 10B, fastening between the center stay-side reinforcing member 5b and the cross car beam 1 is achieved, using the fastening holes N1 to N4, Q3 to Q6, by three-component co-fastening (2B) for the center stay-side reinforcing member 5b, the center stay 3 and the cross car beam 1 (using the fastening holes N1, N2, Q5, Q6), and two-component co-fastening (2C) for the center stay-side reinforcing member 5b and the cross car beam 1 (using the fastening holes N3, N4, Q3, Q4). The number of fastening points between the center stay-side reinforcing member 5b and the cross car beam 1 is typically one or more, preferably two or more. Particularly, in the case where the steering device support structure is used in an automobile, the number is preferably from six to twelve.

The fastening between the center stay-side reinforcing member 5b and the cross car beam 1 needs not necessarily be achieved by the combination of the three-component co-fastening (2B) and the two-component co-fastening (2C), but may be achieved by at least one of the two types of co-fastenings. From the viewpoint of a further improvement in the steering device vibration performance, the fastening between the center stay-side reinforcing member 5b and the cross car beam 1 is preferably achieved by the combination of the three-component co-fastening (2B) and the two-component co-fastening (2C).

In the case where the center stay 3 has the protrusion 35, the center stay-side reinforcing member 5b preferably has a concaved-shaped wall portion 55 formed on the side of the center stay 3 to cover the two principle surfaces (side surfaces) of the protrusion 35. The protrusion 35 is fittingly engaged with the concaved-shaped wall portion 55, so that the steering device support structure 10 becomes much less likely to undergo torsional deformation, and thereby vibration becomes much less likely to be transmitted. Thus, the steering device vibration performance is further sufficiently improved.

As depicted in FIG. 10A, etc., the concaved-shaped wall portion 55 is configured to cover the two principal surfaces (side surfaces) and one of the edge faces of the protrusion. That is, the concaved-shaped wall portion 55 comprises two wall surface portions 55a, 55b each facing a respective one of the two principal surfaces (side surfaces) of the protrusion 35, and a wall surface portion 55c facing the edge face of the protrusion 35. However, the concaved-shaped wall portion 55 is not limited thereto, but may consist only of the wall surface portions 55a, 55b. From the viewpoint of a further improvement in the steering device vibration performance, the concaved-shaped wall portion 55 preferably comprises the wall surface portions 55a, 55b, and the wall surface portion 55c.

Typically, each of the wall surface portions 55a, 55b of the concave-shaped wall portion 55 is formed to extend along a direction parallel to the axial direction of the cross car beam, at positions corresponding to the two principal surfaces (side surfaces) of the protrusion 35. Thus, the concave-shaped wall portion 55 makes it possible to impart the resistance to flexural stress converted from torsional stress, to the steering device support structure 10, as in the width-directional rib (502b) of the reinforcing member 5. Particularly, in the case where the steering device support structure 10 has the reinforcing member 5 on the planar portion formed in the rear surface of the cross car beam, the concave-shaped wall portion 55 makes it possible to reduce displacement in the longitudinal direction (forward-rearward direction (F-R direction)) due to the flexural stress. Therefore, by providing the concave-shaped wall portion 55, the steering device vibration performance is further improved.

A gap between the concave-shaped wall portion 55 and the protrusion 35 may be filled with an adhesive.

The number of the concave-shaped wall portions 55 in the center stay-side reinforcing member 5b is not particularly limited. In the case where the steering device support structure is used in an automobile, the number may be typically set to a value corresponding to the number of the protrusions 35 per the center stay-side reinforcing member 5b.

An R-directional height hc (FIG. 10A) of the concave-shaped wall portion 55 is typically from 0.01×D to 0.4×D, where D denotes the width (mm) of the rear surface 1b of the cross car beam 1. Further, from the viewpoint of the balance between a further reduction in weight and a further improvement in the steering device vibration performance, the R-directional height hc is preferably from 0.02×D to 0.3×D, more preferably from 0.05×D to 0.2×D. As the height hc is increased, the steering device vibration performance is further improved based on "reduction in flexural deformation-caused displacement by means of fitting engagement between the center stay and the reinforcing member".

A W-directional length Cc (FIG. 10A) of the concave-shaped wall portion 55 is not particularly limited, but typically from 0.1×D to 1×D, where D denotes the width (mm) of the rear surface 1b of the cross car beam 1. Further, from the viewpoint of the balance between a further reduction in weight and a further improvement in the steering device vibration performance, the W-directional length Cc is preferably from 0.1×D to 0.5×D, more preferably from 0.2×D to 0.4×D.

The thickness of the wall surface portion constituting the concave-shaped wall portion 55 is not particularly limited, but may be appropriately determined depending on the intended use of the steering device support structure. In the case where the steering device support structure is used in a vehicle, particularly in an automobile, the thickness of the wall surface portion is typically from 0.5 to 5 mm. Further, from the viewpoint of the balance between a further reduction in weight and a further improvement in the steering device vibration performance, the thickness of the wall surface portion is preferably from 1 to 4 mm.

In this embodiment, the fastening between the center stay-side reinforcing member 5b and the center stay 3 is also achieved by the fitting engagement of the protrusion 35 with the concave-shaped wall portion 55. However, in the present invention, the above fastening needs not necessarily be achieved by the fitting engagement of the protrusion 35 with the concave-shaped wall portion 55, but it is apparent that the advantageous effects of the present invention can be obtained without fastening based on this fitting engagement.

In this embodiment, the side bracket-side reinforcing member 5a and the center stay-side reinforcing member 5b are used as separate members. However, in another embodiment, the side bracket-side reinforcing member 5a and the center stay-side reinforcing member 5b may be used as a single integrated member. In this case, for example, the side bracket-side reinforcing member 5a and the center stay-side reinforcing member 5b may be connected by a surface member to form an integral reinforcing member. A steering device support structure using such an integral reinforcing member has the same layout and structure as those of the steering device support structure as depicted in FIG. 1, etc., except that the surface member for connecting the side bracket-side reinforcing member 5a and the center stay-side reinforcing member 5b together is disposed between the cross car beam 1 and the steering device support member 2.

In another preferred embodiment, in the case where fastening between the reinforcing member 5 (5a, 5b) is achieved by a bolt, this fastening is preferably performed such that an axial direction of the bolt is oriented parallel to the axial direction of the cross car beam 1, from the viewpoint of a further improvement in the steering device vibration performance. From this view point, in the present invention, it is preferable to achieve the following fastening.

Specifically, it is preferable to achieve the fastening between the side bracket-side reinforcing member 5a and the steering device support member 2, by bolts inserted into at least the fastening holes P1, P2 of the fastening peripheral piece 51a (FIG. 2A), and/or achieve the fastening between the center stay-side reinforcing member 5b and the steering device support member 2, by bolts inserted into at least the fastening holes Q1, Q2 of the fastening peripheral piece 51b (FIGS. 2B and 10A).

In the same viewpoint, it is preferable to achieve the following fastening, although the axial direction of a bolt is not exactly oriented parallel to the axial direction of the cross car beam 1.

Specifically, it is preferable to achieve the fastening between the central stay-side reinforcing member 5*b* and the central stay 3, by a bolt inserted into at least the fastening hole Q7 of the fastening peripheral piece 54*b* (FIG. 10A).

A material for the reinforcing member 5 is not particularly limited. Example of the material may include the same materials as those for the steering device support member 2. From the viewpoint of a further reduction in weight, and a further improvement in the collision performance and the steering device vibration performance, the material for the reinforcing member 5 is preferably a polymer material. The polymer material for the reinforcing member 5 is not particularly limited. Examples of the polymer material may include the same polymer materials as those for the steering device support member 2. Preferably, the polymer material is FRTP. In the case where the reinforcing member 5 is formed of the polymer material, it can be produced by, e.g., injection molding.

INDUSTRIAL APPLICABILITY

The steering device support structure 10 of the present invention is a structure for supporting a steering device of a vehicle. In this specification, the term "vehicle" includes not only vehicles such as automobiles, buses, trucks and electric trains (railroad vehicles), but also any other vehicle (transporter) equipped with a steering device. For example, the term "vehicle" includes airplanes and marine vessels.

The invention claimed is:

1. A steering device support structure for a vehicle, comprising:
    a cross car beam having a given axial direction and comprising a planar portion extending along the axial direction;
    a steering device support member attached to the cross car beam to support a steering device;
    a center stay for supporting the cross car beam, and
    a reinforcing member provided to the cross car beam to cover the planar portion of the cross car beam, and fastened to the steering device support member,
    wherein the steering device support structure further comprises first and second side brackets for fixing opposite ends of the cross car beam to a body of the vehicle so as to support the cross car beam at the opposite ends thereof, wherein the reinforcement member is fastened to the steering device support member, and at least one of the first side bracket and the center stay.

2. The steering device support structure according to claim 1, wherein the cross car beam has a rectangular shape in cross-sectional view, the rectangular shape having a top surface, a bottom surface, a front surface and a rear surface, and wherein the planar portion of the cross car beam is formed in the rear surface of the cross car beam, and the reinforcing member is provided to cover the rear surface.

3. The steering device support structure according to claim 1, wherein
    the steering device support member and the center stay are provided on the cross car beam in spaced-apart relation to each other, and
    the reinforcing member is provided to cover a part of the planner portion of the cross car beam located between the steering device support member and the center stay.

4. A steering device support structure for a vehicle, comprising:
    a cross car beam having a given axial direction and comprising a planar portion extending along the axial direction;
    a steering device support member attached to the cross car beam to support a steering device;
    a center stay for supporting the cross car beam, and
    a reinforcing member provided to the cross car beam to cover the planar portion of the cross car beam, and fastened to the steering device support member,
    wherein the steering device support structure further comprises first and second side brackets for fixing opposite ends of the cross car beam to a body of the vehicle so as to support the cross car beam at the opposite ends thereof, wherein
    the steering device support member and each of the first and second side brackets are provided on the cross car beam in spaced-apart relation to each other, and
    the reinforcing member includes a side bracket-side reinforcing member provided to cover a part of the planner portion of the cross car beam located between the first side bracket and the steering device support member.

5. The steering device support structure according to claim 4, wherein the side bracket-side reinforcing member is fastened to at least the steering device support member, and wherein the fastening between the side bracket-side reinforcing member and the steering device support member is achieved by two-component co-fastening for the side bracket-side reinforcing member and the steering device support member.

6. The steering device support structure according to claim 5, wherein
    the side bracket-side reinforcing member has a fastening end portion on the side of the steering device support member, and
    the steering device support member comprises an upper segment and a lower segment,
    and wherein the two-component co-fastening for the side bracket-side reinforcing member and the steering device support member is achieved by fastening between the fastening end portion of the side bracket-side reinforcing member and each of the upper and lower segments of the steering device support member.

7. The steering device support structure according to claim 5, wherein the side bracket-side reinforcing member is further fastened to the first side bracket, and wherein the fastening between the side bracket-side reinforcing member and the first side bracket is achieved by three-component co-fastening for the side bracket-side reinforcing member, the first side bracket, and the cross car beam.

8. The steering device support structure according to claim 5, wherein the side bracket-side reinforcing member is further fastened to the cross car beam, and wherein the fastening between the side bracket-side reinforcing member and the cross car beam is achieved by three-component co-fastening for the side bracket-side reinforcing member, the first side bracket, and the cross car beam, and/or two-component co-fastening for the side bracket-side reinforcing member and the cross car beam.

9. The steering device support structure according to claim 4, wherein the cross car beam has a rectangular shape in cross-sectional view, the rectangular shape having a top surface, a bottom surface, a front surface and a rear surface, and wherein the planar portion of the cross car beam is formed in the rear surface of the cross car beam, and the side bracket-side reinforcing member has an extension portion extending along the top surface and the bottom surface of the cross car beam so as to form an angular C-shaped surrounding portion which covers the planner portion formed in the rear surface of the cross car beam, a part of the top surface of the cross car beam, and a part of the bottom surface of the cross car beam.

10. The steering device support structure according to claim 4, wherein the cross car beam has a rectangular shape in cross-sectional view, the rectangular shape having a top surface, a bottom surface, a front surface and a rear surface, and wherein the planar portion of the cross car beam is formed in the rear surface of the cross car beam, and the reinforcing member is provided to cover the rear surface.

11. A steering device support structure for a vehicle, comprising:
a cross car beam having a given axial direction and comprising a planar portion extending along the axial direction;
a steering device support member attached to the cross car beam to support a steering device;
a center stay for supporting the cross car beam, and
a reinforcing member provided to the cross car beam to cover the planar portion of the cross car beam, and fastened to the steering device support member,
wherein the center stay and the steering device support member are provided on the cross car beam in spaced-apart relation to each other, and the reinforcing member includes a center stay-side reinforcing member provided to cover a part of the planar portion of the cross car beam located between the center stay and the steering device support member.

12. The steering device support structure according to claim 11, wherein the center stay-side reinforcing member is fastened to at least the steering device support member, and wherein the fastening between the center stay-side reinforcing member and the steering device support member is achieved by two-component co-fastening for the center stay-side reinforcing member and the steering device support member.

13. The steering device support structure according to claim 12, wherein
the center stay-side reinforcing member has a fastening end portion on the side of the steering device support member, and
the steering device support member comprises an upper segment and a lower segment,
and wherein the two-component co-fastening for the center stay-side reinforcing member and the steering device support member is achieved by fastening between the fastening end portion of the center stay-side reinforcing member and each of the upper and lower segments of the steering device support member.

14. The steering device support structure according to claim 12, wherein the center stay-side reinforcing member is further fastened to the center stay, and wherein the fastening between the center stay-side reinforcing member and the center stay is achieved by three-component co-fastening for the center stay-side reinforcing member, the center stay, and the cross car beam, and/or two-component co-fastening for the center stay-side reinforcing member and the center stay.

15. The steering device support structure according to claim 12, wherein the center stay-side reinforcing member is further fastened to the cross car beam, and wherein the fastening between the center stay-side reinforcing member and the cross car beam is achieved by three-component co-fastening for the center stay-side reinforcing member, the center stay, and the cross car beam, and/or two-component co-fastening for the center stay-side reinforcing member and the cross car beam.

16. The steering device support structure according to claim 11, wherein the cross car beam has a rectangular shape in cross-sectional view, the rectangular shape having a top surface, a bottom surface, a front surface and a rear surface, and wherein the planar portion of the cross car beam is formed in the rear surface of the cross car beam, and the center stay-side reinforcing member has an extension portion extending along the top surface and the bottom surface of the cross car beam so as to form an angular C-shaped surrounding portion which covers the planner portion formed in the rear surface of the cross car beam, a part of the top surface of the cross car beam, and a part of the bottom surface of the cross car beam.

17. The steering device support structure according to claim 11, wherein the cross car beam has a rectangular shape in cross-sectional view, the rectangular shape having a top surface, a bottom surface, a front surface and a rear surface, and wherein the planar portion of the cross car beam is formed in the rear surface of the cross car beam, and the reinforcing member is provided to cover the rear surface.

18. The steering device support structure according to claim 11, wherein
the steering device support member and the center stay are provided on the cross car beam in spaced-apart relation to each other, and
the reinforcing member is provided to cover a part of the planner portion of the cross car beam located between the steering device support member and the center stay.

* * * * *